United States Patent [19]

Ohta

[11] Patent Number: 5,441,251
[45] Date of Patent: Aug. 15, 1995

[54] SHEET ARTICLE CONTAINING CASSETTE AND SYSTEM

[75] Inventor: Yasunori Ohta, Kanagawa, Japan

[73] Assignee: Fuji Photo Film Co., Ltd., Kanagawa, Japan

[21] Appl. No.: 84,475

[22] Filed: Jul. 1, 1993

Related U.S. Application Data

[63] Continuation-in-part of Ser. No. 870,992, Apr. 20, 1992, abandoned.

[30] Foreign Application Priority Data

| | | | |
|---|---|---|---|
| Apr. 19, 1991 | [JP] | Japan | 3-088038 |
| Apr. 19, 1991 | [JP] | Japan | 3-088428 |
| Apr. 19, 1991 | [JP] | Japan | 3-088775 |
| May 20, 1991 | [JP] | Japan | 3-114324 |
| Jul. 1, 1992 | [JP] | Japan | 4-174194 |
| Feb. 9, 1993 | [JP] | Japan | 5-021154 |

[51] Int. Cl.[6] .............................. B65H 1/00
[52] U.S. Cl. .................... 271/145; 271/164; 206/818; 206/449; 378/188
[58] Field of Search ............ 206/456, 455, 449, 45.4, 206/39, 39.4, 818; 271/145, 166, 162, 164; 378/182, 184, 187, 188, 169

[56] References Cited

U.S. PATENT DOCUMENTS

| 150,250 | 4/1874 | Mitchell | 206/39 |
|---|---|---|---|
| 164,833 | 6/1875 | Hall | 206/39 |
| 3,857,040 | 12/1974 | Zwettler et al. | 378/182 |
| 4,346,300 | 8/1982 | Turner | 378/187 |
| 4,744,100 | 5/1988 | Bauer et al. | 378/188 |
| 5,125,505 | 6/1992 | Kurosaki | 206/39.4 |
| 5,172,905 | 12/1992 | Vanous et al. | 378/188 |
| 5,265,865 | 11/1993 | Agano et al. | 271/145 |

*Primary Examiner*—H. Grant Skaggs
*Attorney, Agent, or Firm*—Sughrue, Mion, Zinn, Macpeak & Seas; Richard C. Turner; Peter A. McKenna

[57] ABSTRACT

Herein disclosed is a sheet article containing cassette which has a holding function to contain a sheet article, even if the cassette is in a vertical position with its ejection slot down, or to eject the sheet article without fail. Also disclosed is a sheet article containing system which has a holding function to contain a sheet article, even if it is in a vertical position with its ejection slot down, or to eject the sheet article. These functions can be achieved by holding means for holding the sheet article frictionally, by a slide member for pushing the sheet article, by magnetically attracting means disposed at the sheet article and the cassette, and by magnetically attracting means disposed on the sheet article and the apparatus using the same. That is, by the present invention, the sheet article can be ejected and containing in the cassette even if the cassette is loaded in any position, particularly in vertical position with its ejection slot down. Therefore, according to the present invention, it can be automatically executed with the simple construction that the stimulable phosphor sheet is transferred from the cassette to the radiation image information reading apparatus and that the read phosphor sheet is contained in the cassette.

13 Claims, 23 Drawing Sheets

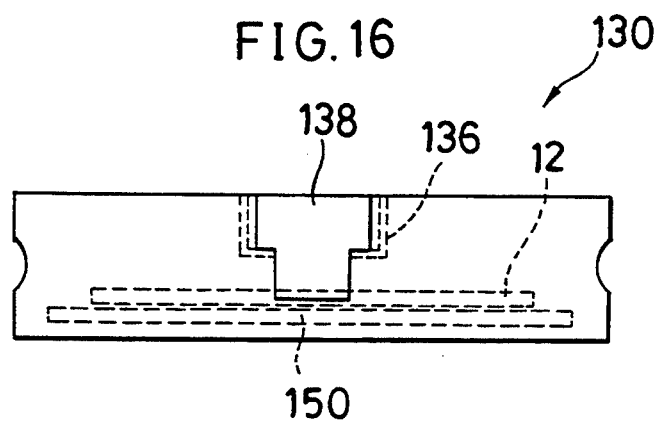
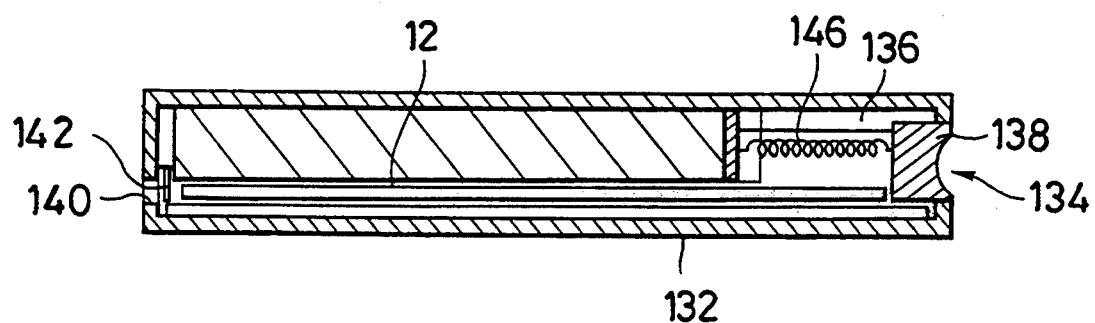
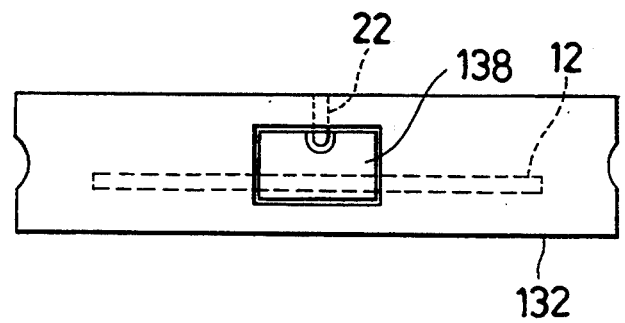

SHEET ARTICLE CONTAINING CASSETTE AND SYSTEM

This is a Continuation-in-part of application Ser. No. 07/870,992, filed Apr. 20, 1992, now abandoned.

BACKGROUND OF THE INVENTION

The present invention relates to both a cassette for containing a sheet article such as a stimulable phosphor sheet or an X-ray film and a sheet article containing system for containing the sheet article in a container such as the cassette. More particularly, the present invention relates to both a cassette having a holding function to contain the sheet article, even if it is in a vertical position with its ejections lot down, or to eject the sheet article and a sheet article containing system having a holding function to contain the sheet article, even if the cassette is in the vertical position with its ejection slot down, and/or a function to eject the sheet article.

As is well known in the art, a fluorescent material (phosphor) of some kind stores a portion of the radiation energy of a radiation (e.g., X-ray, $\alpha$-ray, $\beta$-ray, $\gamma$-ray, electron beam or ultraviolet ray), when irradiated, and exhibits the extinct luminescence (stimulated emission) according to the stored energy if it irradiated with an excited ray (stimulating ray) such as a visible light. The fluorescent material having such characteristics is called the stimulable phosphor substance (or the luminescence-extinct fluorescent substance).

The assignee previously has proposed a radiation image information recording/reproducing system (as disclosed in the U.S. Pat. No. 4,258,264), in which the radiation image information of an object such as a human body are once recorded in a sheet having a layer of stimulable phosphor material (which will be shortly referred to as the "fluorescent sheet" or "phosphor sheet") by making use of the stimulable phosphor material and in which the radiation image of the object is outputted as a visible image to a recording material such as a photosensitive material or a display such as a CRT on the basis of image signals by scanning the phosphor sheet two-dimensionally with an excited beam such as a laser beam to establish a luminescence-extinct light, and by reading this luminescence-extinct light photoelectrically to produce those image signals.

In this radiation image information recording and reproducing system, the operations of recording and reading the image on and from the phosphor sheet are accomplished in the prior art in the following manners.

First of all, the storage and recording of the radiation image information in the phosphor sheet are accomplished by containing the phosphor sheet in a shielding container called the "cassette" and by irradiating the sheet with the radiation through the object or by holding the sheet in contact with the object containing a radiation marker substance. The phosphor sheet recorded with the image is loaded, while being contained in the cassette, in the radiation image information reading apparatus (which will be shortly referred to as the "reading apparatus"). When this reading apparatus is loaded with the cassette, the phosphor sheet is ejected from the cassette by the sheeting mechanism of the reading apparatus and is conveyed to the image reading unit. In this image reading unit, an excited optical beam having a constant intensity emitted from an excited beam source such as a He—Ne laser is reflected and deflected in a main scanning direction by an optical deflector such as a galvanometer mirror to irradiate the phosphor sheet through various optical elements such as an f$\theta$ lens. Here, the phosphor sheet is conveyed in an auxiliary scanning direction substantially perpendicular to the main scanning direction by conveyer means such as a belt conveyor or nip rollers. As a result, the excited beam thus deflected in the main scanning direction can scan the phosphor sheet two-dimensionally all over its surface. From the portion of the phosphor sheet irradiated with the excited beam, there is generated the luminescence-extinct light according to the radiation image information which is stored in that portion.

This luminescence-extinct beam is either directly incident upon the incidence face of the optical guide or reflected by a condensing mirror, which is arranged to face that incidence face, to come into the incidence plane of the optical guide. The beam is then guided by the optical guide into a photomultiplier through a filter for cutting the light in the wavelength range of the excited beam so that it is photoelectrically converted into electric signals. These electric signals are processed so that they are reproduced as the visible image on the CRT or the photosensitive material or recorded and stored in the various recording mediums.

Thus, in the radiation image information recording and reproducing system, the phosphor sheet is basically handled while being contained in a shielding casing called the cassette. This is because the phosphor sheet will have its stored and recorded image information erased, if irradiated with a light, or will be stored and recorded as the image information with the ultraviolet ray contained in the light. Therefore, the phosphor sheet may preferably be handled as shielded as possible. For this preference, the ordinary reading apparatus is loaded with the phosphor sheet stored and recorded with the image information, while being contained in the cassette, as has been described hereinbefore, and the image information is read out by ejecting the phosphor sheet from the cassette in the apparatus. On the other hand, the stimulable phosphor sheet having been read is contained again in the cassette after its residual radiation image information has been erased.

Here, the cassette for containing the phosphor sheet is ordinarily constructed of a casing and a cover for the casing such that it can be opened and closed by supporting one side of the cover on the casing. In the conventional reading apparatus using such cassette and phosphor sheet, when the cassette containing the phosphor sheet is set in a predetermined position, the cover is opened by opening means using the complicated link mechanism or by sucking means such as a suction cup to stick the cover. Then, the phosphor sheet is ejected to the outside of the cassette (or the casing) by sheeting mechanism using the sucking means and is placed on the predetermined position of conveyer means and conveyed to the reading position by the conveyer means including paired rollers, a belt conveyor and guide members. Moreover, the phosphor sheet having been read is contained again in the cassette after its residual radiation image information has been erased, as has been described hereinbefore, so that it may be prepared for a subsequent image recording operation (as disclosed in the U.S. Pat. Nos. 4,777,365 and 5,061,852).

Specifically, the conventional reading apparatus has to be equipped, so as to eject the phosphor sheet from the cassette and to contain it again, with the complicated cassette opening mechanism using the link mechanism or the sucking means, the complicated sheeting mechanism for the phosphor sheet using the sucking means, and the control unit for these operation so that it is complicated and large-sized to raise its production cost.

In view of these problems, on the other hand, the assignee has proposed a reading apparatus and a sheet ejecting mechanism, in which the cassette is loaded generally in a vertical position with its opening (i.e., an ejection slot or an insertion slot) and in which the phosphor sheet is caused to fall by its empty weight by opening the cassette by means of a wedge or solenoid, as disclosed in the U.S. Pat. No. 4,889,989. According to these proposals, the apparatus can be simplified because it need not use the complicated link mechanism or the sucking means as the opening mechanism or the sheeting mechanism.

Incidentally, since the reading apparatus (or mechanism) using the fall due to the empty weight is loaded with the cassette having its open end down, the phosphor sheet having been read is seriously hard to be contain as it is in the cassette. Thus, the cassette has to be moved to another place so as to have its open end directed upward, or the phosphor sheet having been read has to be contained in the cassette manually by the operator.

SUMMARY OF THE INVENTION

The present invention contemplates to solve the above-specified problems and has a first object to provide a sheet article containing cassette having a sheet article protecting function, which can contain the sheet article such as the phosphor sheet even if the sheet article is loaded generally in a vertical position with its ejection slot down in a reading apparatus.

A second object of the present invention is to provide a sheet article containing cassette which can eject the sheet article such as the phosphor sheet contained in an apparatus having a simple construction, without using the link mechanism or the attraction means as the opening mechanism and the sheeting mechanism.

A third object of the present invention is to provide a sheet article containing system by which the sheet article such as the phosphor sheet can be contained in a container such as a cassette even if the cassette containing the sheet article is loaded generally in a vertical position with its ejection slot down in a reading apparatus.

A fourth object of the present invention is to provide a sheet article containing system by which the sheet article such as the phosphor sheet can be ejected and contained in a container such as a cassette even if the cassette containing the sheet article is loaded generally in a vertical position with its ejection slot down in a reading apparatus and by which the cassette containing the sheet article can be taken out of the reading apparatus.

To achieve the first object, there is provided by its first aspect of the present invention a sheet article containing cassette comprising: a casing for containing a sheet article; a cover so disposed at a side portion of said casing that it can be freely opened and closed; and holding means for holding said sheet article frictionally by abutting against the sheet article contained.

Preferably, said sheet article includes a recording medium having a recording layer on a substrate, and wherein said holding means is adapted to abut against the substrate of said sheet article.

Preferably, said cassette further comprises a member formed on the abutment face of the inner wall face of said casing against said recording layer for protecting said recording layer.

Preferably, said holding means includes an elastic member.

To achieve the second object, there is provided by its second aspect of the present invention a sheet article containing cassette comprising: a casing for containing a sheet article having an ejection slot; and a push member having a slide mechanism for pushing the end portion of said sheet article opposed to the ejection side of the sheet article.

Preferably, said cassette further comprises a holding mechanism for holding said sheet article therein.

Preferably, said holding mechanism includes holding means for holding said sheet article frictionally by abutting against the sheet article contained.

Preferably, said holding means includes an elastic member.

Preferably, said holding mechanism includes pawls disposed in the vicinity of the sheet article ejecting slot, which is pivotally supported by the casing.

To achieve the third object, there is provided by its third aspect of the present invention a sheet article containing system for containing a sheet article in a container having its ejection and insertion slot directed downward, wherein a magnet is arranged on one of the back face of said sheet article and the inner wall face of said container, which is opposed to the back face of said sheet article when said sheet article is contained, whereas a member to be magnetically attracted by said magnet is arranged on the other so that said sheet article is contained in a casing by attracting said magnet and said member to each other.

Preferably, said magnet and/or said member to be magnetically attracted by said magnet are tapered in the containing direction of said sheet article.

Preferably, a member for protecting the front surface of said sheet article is disposed on the abutting inner wall face of said casing against said front surface.

To achieve the fourth object, there is provided by its fourth aspect of the present invention a sheet article containing system for containing a sheet article in a container including a casing and a cover for said casing, when said container is loaded in an apparatus with its ejection and insertion slot down, wherein an electromagnet is arranged in a container loading unit of said apparatus whereas a magnetic member to be magnetically attracted by said electromagnet is arranged on the back face of said sheet article, so that after said sheet article has been conveyed to a predetermined position in said container by containing means of said apparatus, said electromagnet is energized to attract said magnetic member to close the cover of said casing.

Preferably, a member for protecting the front surface of said sheet article is disposed on the abutting face of the inner wall of said casing against said front surface.

BRIEF DESCRIPTION OF THE DRAWINGS

FIG. 16 is schematic diagram showing the sheet article containing cassette of FIG. 14, as viewed from the opposite side of the ejection slot thereof;

FIG. 19 is a schematic sectional view showing another embodiment of the sheet article containing cassette according to the second aspect of the present invention;

FIG. 20 is a schematic diagram showing the sheet article containing cassette of FIG. 19, as viewed from the opposite side of the ejection slot thereof;

DESCRIPTION OF THE PREFERRED EMBODIMENTS

A sheet article containing cassette and a sheet article containing system according to the present invention will be described in detail in the following.

A cassette according to a first aspect of the present invention is adapted to contain a sheet article such as a phosphor sheet or an X-ray film and is equipped on its inner wall with holding means for abutting against the sheet article to hold the same in a falling direction with its frictional force.

This cassette according to the first aspect of the present invention contains a phosphor sheet, for example, and is loaded in a vertical position having its ejection slot down in a radiation image information reading apparatus so that after its contained phosphor sheet has been ejected, even if it would contain again the read phosphor sheet, as it is, it can hold the read phosphor sheet against a fall.

Therefore, the sheet article can be ejected and contained in the cassette which is loaded in the vertical position in such an apparatus as a radiation image information reading apparatus by applying the sheet article containing cassette of the present aspect. Therefore, not only the phosphor sheet ejection mechanism of the radiation image information reading apparatus can be simplified, but also the need to move the cassette can be eliminated so that the cassette can automatically contain a sheet article while being loaded in the vertical position, thus making it possible to enhance operational ease.

Figure 1:
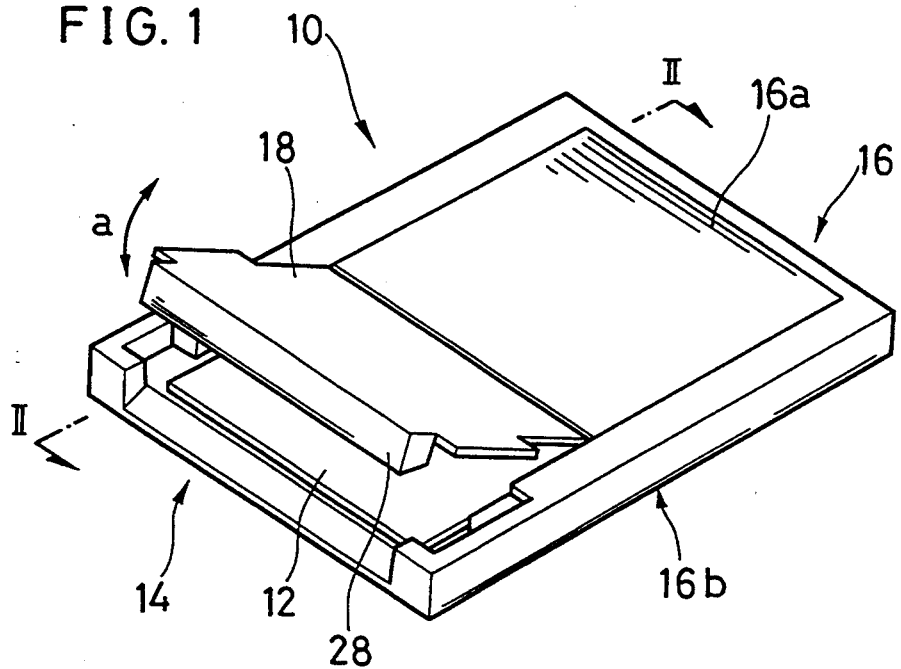
FIG. 1 is a schematic perspective view showing one embodiment of a sheet article containing cassette according to a first aspect of the present invention.

FIG. 1 is a schematic perspective view showing an embodiment, in which the sheet article containing cassette according to the first aspect of the present invention is used as the cassette for the phosphor sheet.

A cassette 10, as shown in FIG. 1, contains a phosphor sheet 12 formed with a stimulable phosphor layer (as will be shortly referred to as a recording layer) on a substrate. The cassette 10 is basically constructed to include: a casing 16 containing the phosphor sheet 12, in which a portion of the face opposed to the contained phosphor sheet 12 and a transversal end 14 leading to the portion of the face are opened; and a cover 18 for closing the open area of the casing 16.

Moreover, on the inner wall of a face 16a (as will be shortly referred to as the "back face" 16a whereas the other face will be named a "front face" or "recording face" 16b), in which is arranged the cover 18 of the casing 16, there is fixed an elastic member 20 (as seen from FIG. 2) which can abut against the phosphor sheet 12 to hold it against a fall.

The casing 16 and the cover 18 are made of a variety of the known materials such as various resins or metals, e.g., aluminum, and the cover 18 can be opened at one side of the open area, as indicated by arrow a, by the known means such as a hinge.

The casing 16 and the cover 18 may be composed of separate members or may be so molded of a resin or the like into a integral structure that the cover 18 can be opened and closed.

In the cassette 10 shown in FIG. 1, the end face 28 of the cover 18 for closing the end face 14 of the casing 16 and a portion of the casing 16 corresponding to the end face 28 are provided with a not-shown lock mechanism which has a projection and hollow for fitting each other to prevent the cassette 10 from opening unexpectedly.

The phosphor sheet 12 is contained in the cassette 10 with its recording layer facing the recording face 16b.

Here, the back face 16a of the cassette 10 has its inner wall face arranged with the elastic member 20 for holding the phosphor sheet 12, as has been described above. In short, the elastic member 20 comes into abutment against the back face (i.e., substrate) of the phosphor sheet 12 to hold the phosphor sheet 12.

Figure 2:
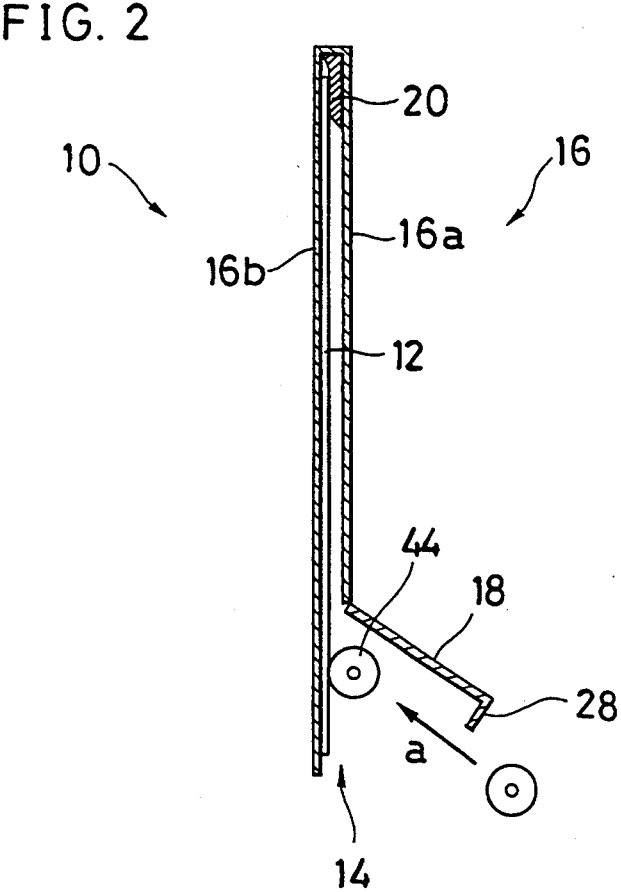
FIG. 2 is a schematic section taken along line II—II of FIG. 1.

FIG. 2 is a conceptional sectional view taken along line II—II of the cassette 10, and FIGS. 3(a) and 3(b) are enlarged sectional views showing a portion of the vicinity of the end portion opposed to the end face 14, namely, the rear end portion (as will be shortly referred to so) in the ejecting direction of the phosphor sheet 12 under the different use conditions.

As shown in FIGS. 2, 3(a) and 3(b), the elastic member 20 is fixed on the inner wall face of the back face 16a at the rear end portion of the cassette 10 so that the phosphor sheet 12 is held, while having its rear end portion clamped between the elastic member 20 and the recording face 16b, by a frictional force (static frictional force) stronger than the falling force of its weight of the phosphor sheet 12.

As a result, the phosphor sheet 12 contained in the cassette will not fall even with its ejection end portion 14 being positioned down (in the vertical position).

Thus, even if the cassette 10 is loaded in the vertical position in the radiation image information reading apparatus, its rear end portion of the read phosphor sheet 12 is pushed into the clearance between the elastic member 20 and the inner wall of the recording face 16b to have the rear end portion held, as illustrated at FIG. 3(a) to FIG. 3(b) when it is contained again in the cassette 10. As a result, the phosphor sheet 12 having been read (or erased) can be contained and held in the cassette 10 as it is (with the cassette 10 being loaded in the apparatus) even if the cassette 10 is not moved.

Since, moreover, the elastic member 20 is arranged at the back side (i.e., at the side of the substrate) with respect to the recording layer of the phosphor sheet 12, it will raise no obstruction when the radiation image information are to be recorded. Still moreover, the phosphor Sheet 12 has its recording layer pushed against the side of the recording face of the cassette 10 so that the image quality can be improved.

The elastic member 20 should not have its material and shape especially restricted but may have its material and shape properly selected to establish such a frictional force as can clamp the phosphor sheet 12 with the inner wall or the like of the cassette 10 to prevent the phosphor sheet 12 from falling by its weight even if its end face 14 providing the ejection slot being positioned down.

The elastic material 20 to be suitably used in the cassette according to the present aspect can be specifically exemplified by Toray PEF (which is produced by Toray), a rubber material such as urethane rubber or a porous resin such as sponge. The shape of the elastic material 20 should not be especially restricted but may be suitably selected to hold the phosphor sheet 12 in accordance with its material used.

In the shown embodiment, the elastic member 20 is arranged on the inner wall face of the back face 16a so as to clamp the phosphor sheet 12 with the recording face 16a. However, the cassette of this aspect should not be restricted thereto but may have its structure modified such that an elastic member is arranged on the inner wall face of a side face (or end face) of the cassette and is caused to abut against the side end face of the phosphor sheet 12 thereby to hold the phosphor sheet 12 with its frictional force.

Moreover, the position, in which the elastic member 20 is to be arranged, should not be restricted to the rear end portion of the shown embodiment but maybe shifted to the vicinity of the center of the cassette or the ejection slot.

Figure 4:
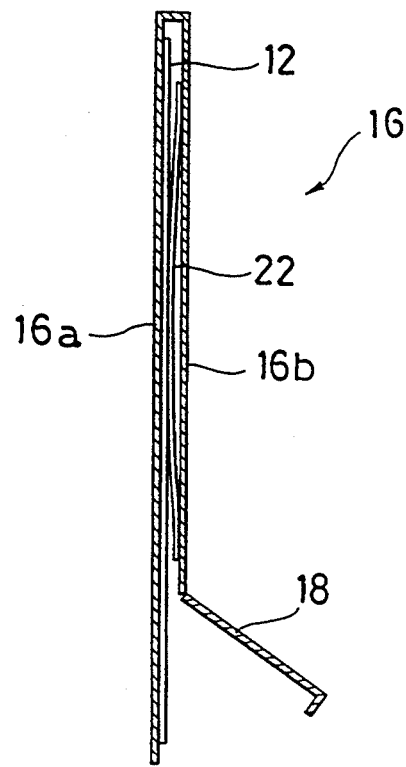
FIG. 4 is a schematic sectional view showing another embodiment of the sheet article containing cassette according to the first aspect of the present invention.

The cassette 10 shown in FIG. 1 has the structure for holding the phosphor sheet 12 by using the elastic member 20. However, the present aspect should not be restricted thereto but may be constructed to hold the phosphor sheet 12 by using a leaf spring 22 made of a metal or resin, as shown in FIG. 4.

The leaf spring may have its shape, strength and arrangement set suitably for establishing a frictional force capable of preventing the phosphor sheet 12 from falling due to its weight.

In the cassette 10 of the present invention in the shown embodiment, the inner wall face of the recording face 16b may preferably be arranged with a protective member for preventing the recording layer of the phosphor sheet 12 because it abuts against the coming recording layer. The protective member can be exemplified by any of the various known materials if the material has such a suitable slidability as will not damage the recording layer of the phosphor sheet 12 contacting with it. The protective member is specifically exemplified by Toray PEF (which is produced by Toray) or TYVEK (which is produced by Du Pont).

The sheet article containing cassette according to the first aspect of the present invention is basically constructed as described above.

Next, a sheet article containing system according to the third aspect of the present invention will be described in the following.

The sheet article containing system according to the third aspect of the present invention contains a sheet article such as a phosphor sheet in a container such as a cassette having its ejection and insertion slot positioned down. Magnets and magnetic materials for attracting each other are arranged on the sheet and the inner wall face of the cassette so that the sheet article is held against a fall by magnetically attracting each other.

In this sheet article containing system, the cassette containing the phosphor sheet is loaded in a vertical position in the radiation image information reading apparatus with its ejection and insertion slot down, and the contained phosphor sheet is ejected. After this, the read phosphor sheet can be contained and held in the cassette without the fall even if it is contained as it is in the cassette.

Therefore, the sheet article can be ejected and contained in the cassette which is loaded in the vertical position in such an apparatus as a radiation image information reading apparatus by applying the sheet article containing system of the present aspect. Therefore, not only the phosphor sheet ejection mechanism of the radiation image information reading apparatus can be simplified, but also the need to move the cassette can be eliminated so that the cassette can automatically contain a sheet article while being loaded in the vertical position, thus making it possible to enhance operational ease.

Figure 5:
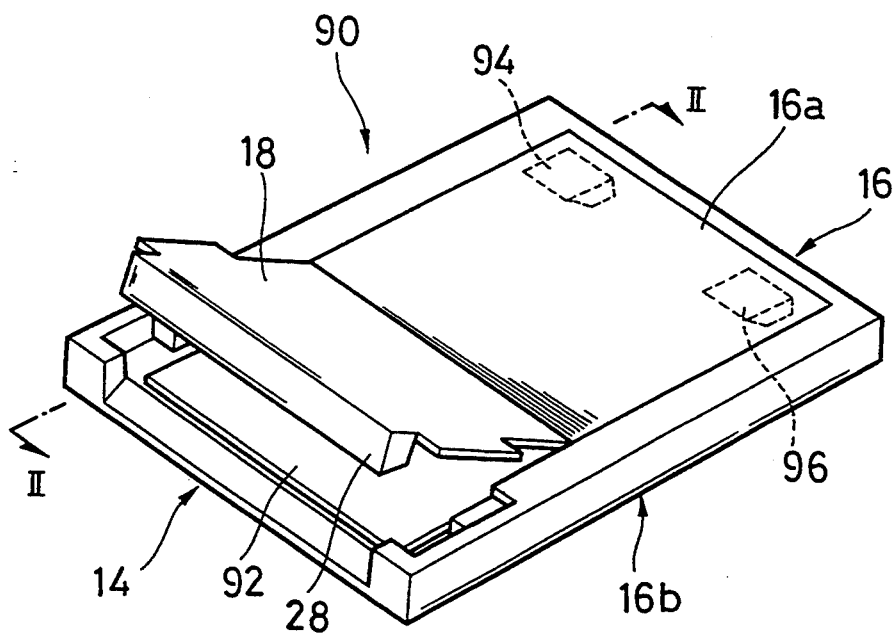
FIG. 5 is a schematic perspective view showing one embodiment of a sheet article containing cassette to be used in a sheet article containing system according to a third aspect of the present invention.
Figure 6:
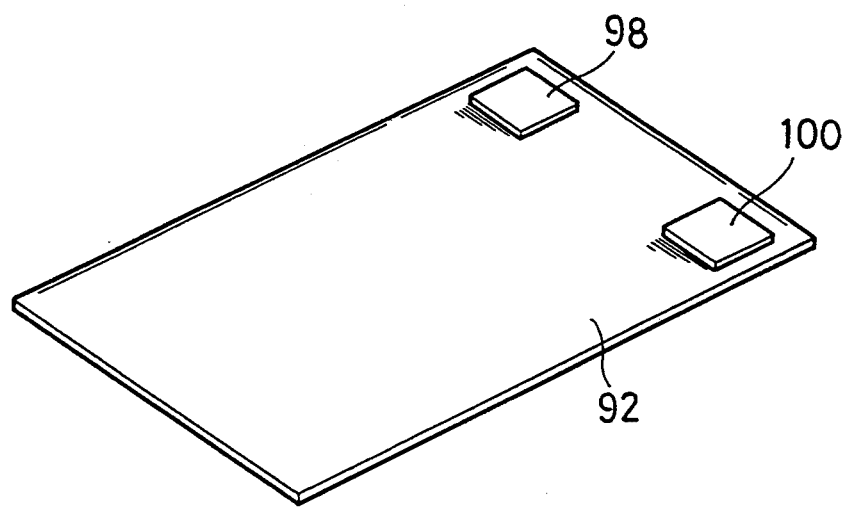
FIG. 6 is a schematic perspective view showing one embodiment of a phosphor sheet to be used in the sheet article containing system according to the third aspect of the present invention.

FIG. 5 is a schematic perspective view showing an example in which the phosphor sheet is contained in the cassette by using the sheet article containing system (as will be shortly referred to as the "containing system") of the present aspect, and FIG. 6 is a schematic perspective view of the phosphor sheet, as viewed from the back side (opposed to the recording layer).

Incidentally, a cassette 90 shown in FIG. 5 is equipped with magnets 94 and 96 and has a structure basically similar to that of the aforementioned cassette 10 shown in FIG. 1 excepting the holding system of a phosphor sheet 92. Thus, the common parts are designated at the identical reference numerals, and their detailed descriptions will be omitted.

The cassette 90 shown in FIG. 5 is used to contain the phosphor sheet 92 and is basically constructed to include: the casing 16 for containing the phosphor sheet 92, in which a portion of the face opposed to the phosphor sheet 92 and the transversal end 14 leading to the portion of the face are opened; and the cover 18 for closing the open area of the casing 16.

In this cassette 90, the magnets 94 and 96 are fixed on the inner wall of the back face 16 of the casing 16a, which is arranged with the cover 18 of the casing 16. On the back face of the phosphor sheet 92, on the other hand, there are fixed sheet magnetic members 98 and 100 to be magnetically attracted by the magnets 94 and 96.

The phosphor sheet 92 is contained in the cassette 90 with the recording layer thereof facing the recording face 16b. Therefore, in the cassette 90 and the phosphor sheet 92 shown in the figures, the magnets 94 and 96 on the inner wall of the back face 16a of the cassette 90 attract magnetically the sheet magnetic members 98 and 100 on the back face of the phosphor sheet 12 to hold the phosphor sheet 92 contained in the cassette 90.

Figure 7:
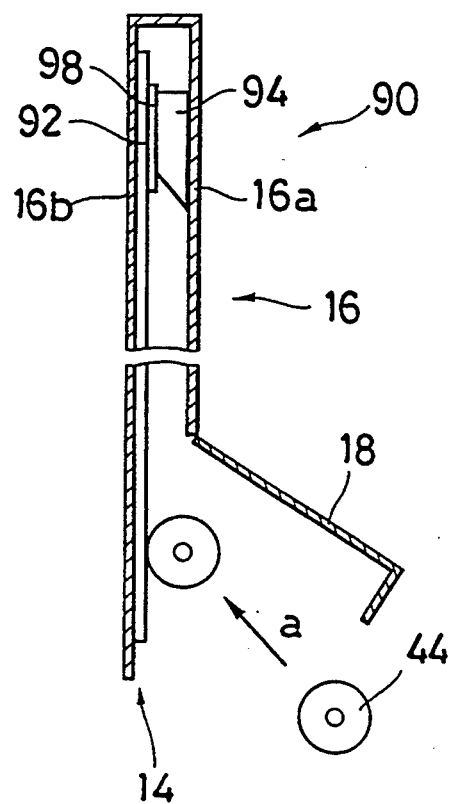
FIG. 7 is a schematic sectional view when the sheet article containing cassette shown in FIG. 5 contains the phosphor sheet shown in FIG. 6.
Figure 8:
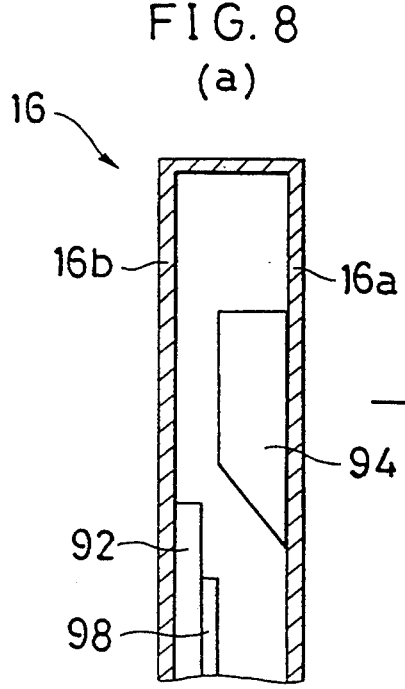
FIGS. 8(a) and 8(b) are enlarged sectional views showing a portion of the cassette of FIG. 7 under different use conditions.
Figure 8:
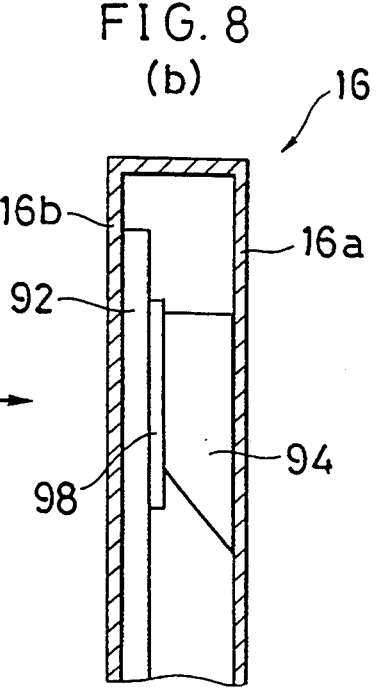

FIG. 7 is a schematic sectional view showing the cassette 90 and taken along line VII—VII. FIG. 8(a) and (b) are enlarged sectional views showing the rear end portion and taken in the ejecting direction of the cassette 90 under different use conditions.

As shown in FIGS. 7, 8(a) and 8(b), the magnet 94 (and 96) is fixed on the inner wall of the back face 16a of the rear end portion of the cassette 90, and the sheet magnetic member 98 (and 100) is fixed on the phosphor sheet 92 so that the phosphor sheet 92 is held, when contained in the cassette 90, by such a force (a magnetic force) stronger than the falling force of the weight thereof as is established by the attractions of the magnet 94 and the sheet magnet 98.

As a result, the contained phosphor sheet 92 will not fall even if the phosphor sheet 92 is positioned such that its end portion 14 formed with the ejection and insertion slot is down (in the vertical position).

Even if the cassette 90 is loaded in the vertical position in the radiation image information reading apparatus with its ejection and insertion slot down, the sheet magnetic member 98 (and 100) of the phosphor sheet 92 comes into contact with the magnet 94 (and 96) so that it is attracted and held by the magnetic force, as shown at FIG. 8(a) to FIG. 8(b), when the read phosphor sheet 92 is contained again in the cassette 90. As a result, the read (or erased) phosphor sheet 92 can be contained and held as it is (loaded in the apparatus) even if the cassette 90 is not moved.

Since, moreover, both the magnets 94 and 96 and the sheet magnetic members 98 and 100 are arranged on the back side with respect to the recording layer of the phosphor sheet 92 so that they raise no obstruction to the recording and reading operations of the radiation image information.

In the shown embodiment, the cassette 90 is arranged with the magnets, and the phosphor sheet 92 is arranged with magnetic members to be attracted by the magnets. Despite of these arrangements, however, the present aspect should not be restricted thereto but can be modified such that the cassette 90 is arranged with the magnetic members whereas the phosphor sheet 92 is arranged with the magnets.

The magnets 94 and 96 to be used in the present aspect should not be especially restricted but may be any of the various permanent magnets or electromagnets if they can coact with the sheet (membrane) magnetic members 98 and 100 to establish the attraction for holding the phosphor sheet 92 against the fall even with the weight.

Moreover, the shape and number of the magnets 94 and 96 should not be especially restricted but may be suitable set in accordance with the shape of the cassette 90 to be applied and the thickness and size of the of the phosphor sheet 92. Incidentally, not only the magnets 94 and 96 but also those to be arranged on the cassette 90 are preferably tapered toward the ejection and insertion slot, as shown in the embodiment, to facilitate the containment of the phosphor sheet 92.

On the other hand, the sheet magnetic members 98 and 100 should not be especially restricted but can be any of the magnets having the reverse polarity or iron foils if they can be attracted by the magnets arranged on the cassette 90.

The method of fixing the magnets or the magnetic members on the cassette 90 and the phosphor sheet 92 should not be restricted but may be any of the various methods such as the adhering method using an adhesive or an adhesive tape or the method of forming the magnets or the magnetic sheets by the various filming methods.

Moreover, the substrate of the phosphor sheet 92 may be mixed with particles or grains of the magnetic material or magnet.

The positions of arranging the magnets 94 and 96 and the sheet magnetic members 98 and 100 should not be restricted to the rear end portions of the shown embodiment but may be located in the vicinity of the center or ejection slot of the cassette. Besides, a part of the back face 16a of the cassette 90 may be constructed with the magnetic material or magnet.

In the cassette 90 of the present aspect of the shown embodiment, too, the recording layer of the phosphor sheet 92 abuts against the inner wall face of the recording face 16b as in the foregoing cassette 10. Thus, it is preferable that a similar recording layer protecting member is arranged on that inner wall face.

Figure 9:
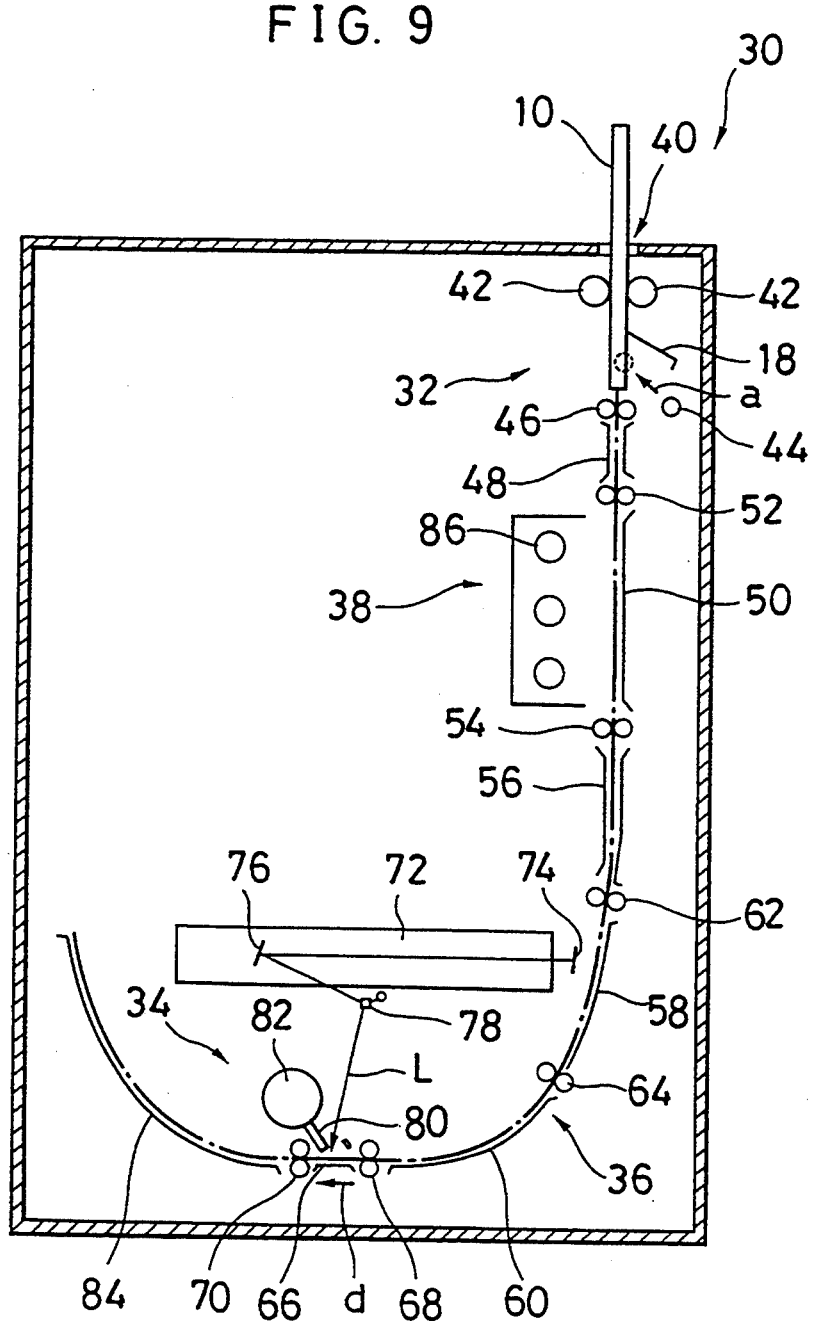
FIG. 9 is a schematic sectional views showing one embodiment of a radiation image information reading apparatus to which are applied the sheet article containing cassette according to the first aspect of the present invention and the sheet article containing system according to the third aspect of the present invention.

FIG. 9 is a schematic sectional view showing a radiation image information reading apparatus using the aforementioned cassette 10 containing the phosphor sheet 12 or the cassette 90 and phosphor sheet 92. The operations of the cassette 10 according to the first aspect, and the cassette 90 and the phosphor sheet 92 which compose the sheet article containing system according to the second aspect will be described with reference to FIG. 9. Since the operations of the reading apparatus are common between the cases in which the cassette 10 is used and in which the cassette 90 and the phosphor sheet 92 are used, the following description will be made by representing the case of using the cassette 10.

A reading apparatus 30 of the shown example is used to read the radiation image information which is stored and recorded in the phosphor sheet 12. The reading apparatus 30 is basically constructed to include: a cassette loader 32 for loading the cassette 10 containing the phosphor sheet 12; a reading unit 34 for reading the radiation image information recorded in the phosphor sheet 12; a conveyer 36 for conveying the phosphor sheet 12 ejected from the cassette loader 32 to the reading unit 34; and an eraser 38 for erasing the radiation image information residing in the phosphor sheet having been read. Incidentally, a single-dotted line appearing in FIG. 9 designates the path along which the phosphor sheet 12 is conveyed.

In the reading apparatus 30, the cassette 10 is loaded in the cassette loader 32 through a loading slot 40 such that its end face 14 having the ejection slot for the phosphor sheet 12 is down. The cassette 10 thus loaded is supported in a predetermined position by support rollers 42.

When the cassette 10 is loaded, the cover 18 is opened, as shown in FIGS. 2 and 9, by the not-shown opening means such as sucking means or wedges.

Since the phosphor sheet 12 has its rear end portion held by the elastic member 20, as shown in FIGS. 2, 3(a) and 3(b), it is not allowed to fall freely but is held in the cassette 10 even if the cover 18 is opened.

In the third aspect of the present invention, since the sheet magnetic members 98 and 100 of the phosphor sheet 12 have been magnetically attracted by the magnets 94 and 96 of the cassette 90, as shown in FIGS. 7 and 8(b), the phosphor sheet 12 is not allowed to fall freely due to its weight but is held in the cassette 90 even if the cover 18 is opened.

When the cover 18 is opened, an ejection roller 44 moves in the direction of arrow a into contact with the back face of the phosphor sheet 12 to eject the phosphor sheet 12 from the cassette 10 when rotated to deliver the phosphor sheet 12 downward.

The phosphor sheet 12 thus ejected is received by a pair of rollers 46 and is conveyed downward, while being guided by guide members 48 and 50, by pairs of rollers 52 and 54 and, while being further guided by guide members 56, 58 and 60, to the reading unit 34 by pairs of rollers 62 and 64.

The phosphor sheet 12 thus delivered into the reading unit 34 is supported by a guide member 66 and is irradiated all over its surface with an excited light L while being clamped and conveyed at a predetermined reading speed in an auxiliary scanning direction, as indicated at arrow d, by pairs of auxiliary scanning transport rollers 68 and 70.

The excited light L is emitted from a light source 72 such as a He—Ne laser and is reflected in a predetermined direction by mirrors 74 and 76 to come into a galvanometer mirror 78 so that it is reflected and deflected in a main scanning direction generally perpendicular to the direction of arrow d until it enters the phosphor sheet 12. Since this phosphor sheet 12 is conveyed in the direction of arrow d, as described above, it is two-dimensionally irradiated all over its surface with the excited light.

Incidentally, the read portion of the phosphor sheet 12 is further conveyed until it is supported by a guide member 84.

From that position of the phosphor sheet 12, which has been irradiated with the excited light L, there is emitted a luminescence-extinct light according to the radiation image information which have been stored and recorded. This luminescence-extinct light is optical by an optical guide 80 into a photodetector 82 such as a photomultiplier, in which it is photoelectrically converted. This electric signal is fed to and processed by a not-shown control circuit and is transferred to an image forming apparatus or a CRT so that it is reproduced as a visible image.

After the image has been read, the phosphor sheet 12 is conveyed in the reverse direction of the auxiliary scanning direction (i.e., in the direction of arrow d) and is guided upward by the guide members 60, 58 and 56 until it is conveyed into the eraser 38.

In this eraser 38, the phosphor sheet 12 is irradiated with an erasing light coming from an erasing light source 86 so that the radiation image information residing even after the end of the reading operation is erased.

The phosphor sheet 12 having ended the erasure of the residing radiation image information in the eraser 38 is conveyed, while being guided by the guide 48, further upward by the paired rollers 52 and 46 until it is inserted from the end face 14 into the cassette 10.

When the phosphor sheet 12 is inserted into the cassette 10, the ejection roller 44 comes into contact with the phosphor sheet 12 and is rotated to convey the phosphor sheet 12 upward until the phosphor sheet 12 is completely contained in the cassette 10.

At this time, the rear end portion of the phosphor sheet 12 is inserted into the clearance between the elastic member 20 and the recording face 16b of the cassette 10 as shown at FIG. 3(a) and FIG. 3(b), so that it is clamped and held therebetween (in the cassette 90 and the phosphor sheet 92 of the third aspect of the present invention shown in FIGS. 5 and 6, the sheet magnetic members 98 and 100 of the phosphor sheet 92 are attracted by the magnets 94 and 96 of the cassette 90 to magnetically hold the phosphor sheet 92 in the cassette 90 shown in FIGS. 8(a) and 8(b)).

As a result, the phosphor sheet 12 (or 92) does not fall but is held in the cassette 10 (or 90) even if the ejection roller 44 leaves the phosphor sheet 12 (or 92), so that the cassette 10 (or 90) can be unloaded from the reading apparatus 30 with its cover 18 being closed under the operation of the pair of support rollers 42.

The sheet article containing cassette according to the first aspect and the sheet article containing system according to the third aspect of the present invention are basically constructed as described above.

Next, the sheet article containing system according to the fourth aspect of the present invention will be described in the following.

In the sheet article containing system of the fourth aspect of the present invention, a sheet article such as a phosphor sheet can be ejected from a container such as a cassette which is loaded in a reading apparatus or the like with its ejection and insertion slot down, and the sheet article can be contained again in the cassette and can be ejected together with the cassette from the apparatus. This apparatus has its cassette loading unit arranged with an electromagnet, and the sheet article has its back face arranged with a magnetic member to be attracted by the electromagnet. After having been contained in the cassette, the sheet article is held in the cassette by energizing the electromagnet, and the cover of the cassette is then closed.

In this sheet article containing system according to the fourth aspect of the present invention, the cassette containing the phosphor sheet is loaded in a vertical position in a radiation image information reading apparatus with its ejection and insertion slot down, and the phosphor sheet contained in the cassette is then ejected. Even if the read phosphor sheet is contained in the cassette, under the condition that the cassette is loaded in the reading apparatus, as it is, it is held against a fall in the cassette,and the cassette can be ejected to the outside of the apparatus with its cover being closed.

Therefore, the sheet article can be ejected and contained in the cassette which is loaded in the vertical position in such an apparatus as a radiation image information reading apparatus by applying the sheet article containing system of the present aspect. Therefore, not only the phosphor sheet ejection mechanism of the reading apparatus can be simplified, but also the need to move the cassette can be eliminated so that the cassette can automatically contain a sheet article while being loaded in the vertical position, thus making it possible to enhance operational ease.

Figure 10:
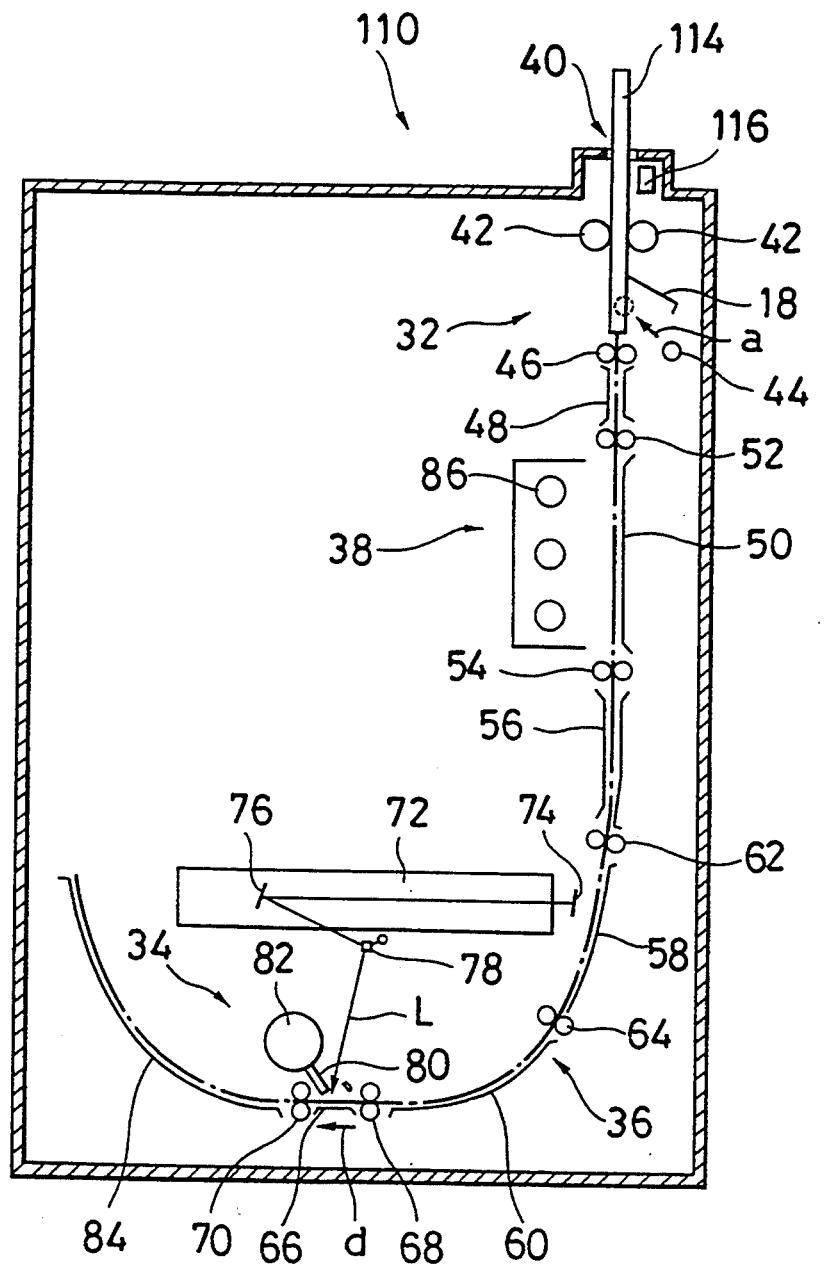
FIG. 10 is a schematic sectional view showing one embodiment of a radiation image information reading apparatus for practicing the sheet article containing system according to a fourth aspect of the present invention.

FIG. 10 is a schematic section showing a radiation image information reading apparatus to which is applied the sheet article containing system (which will be shortly referred to as the "containing mechanism") of the fourth aspect of the present invention.

In the fourth aspect of the present invention to be described in the following, the radiation image information reading apparatus, the cassette and the phosphor sheet are basically constructed to have a structure similar to those of the aforementioned individual modes excepting that an electromagnet is provided with the reading apparatus 116 and a sheet magnetic member 118 is provided with the phosphor sheet and that the system for containing the phosphor sheet in the cassette is different. Thus, the common parts are designated at the identical reference numerals, and their detailed descriptions will be omitted.

Figure 11:
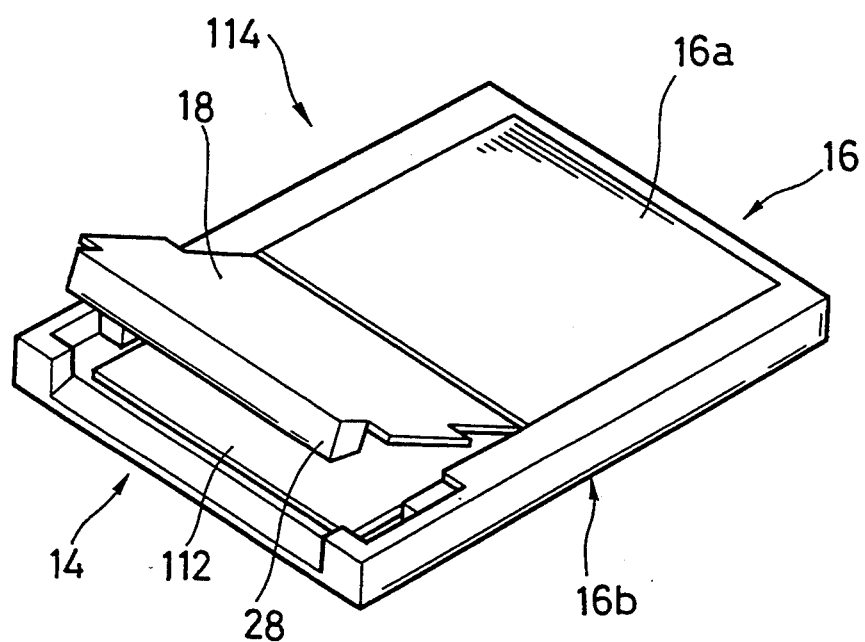
FIG. 11 is a schematic perspective view showing one embodiment of a sheet article containing cassette to be used in the sheet article containing system according to the fourth aspect of the present invention.

A radiation image information reading apparatus 110, as shown in FIG. 10, is used to read the radiation image information which is stored and recorded in a phosphor sheet 112 (as better seen from FIG. 11). The reading apparatus 110 is basically constructed to include: a cassette loading unit 120 for loading a cassette 114; a reading unit 34 for reading the radiation image information stored in the phosphor sheet 112; a conveyer 36 for conveyed the phosphor sheet 112 ejected from the cassette loader 120 to the reading unit 34; and an eraser 38 for erasing the radiation image information residing in the read phosphor sheet 112. Incidentally, a single-dotted line appearing in FIG. 10 indicates a path for conveying the phosphor sheet 112.

In the reading apparatus 110 of the shown embodiment, the cassette loader 120 is arranged with the electromagnet 116 for holding the phosphor sheet 112 in the cassette 114 by magnetically attracting the sheet magnetic member 118 which is arranged on the phosphor sheet 112.

The phosphor sheet 112 recorded with the radiation image information is loaded, while being contained in the cassette 114, in the reading apparatus 110. After having been read, the phosphor sheet 112 is contained again in the cassette 114 until it is ejected from the reading apparatus 110 when the cassette 114 is unloaded from the cassette loader 120.

FIG. 11 is a schematic perspective view showing the cassette 114.

Like the aforementioned cassette 10, the cassette 114 is constructed to include: a casing 16 for containing the phosphor sheet 112, in which a portion of the face opposed to the phosphor sheet 112 and the transverse end 14 leading to the portion of the face are opened; and a casing 18 for closing the open area of the casing 16.

The phosphor sheet 112 is contained in the cassette 114 with its recording layer directed toward the recording face 16b.

Figure 12:
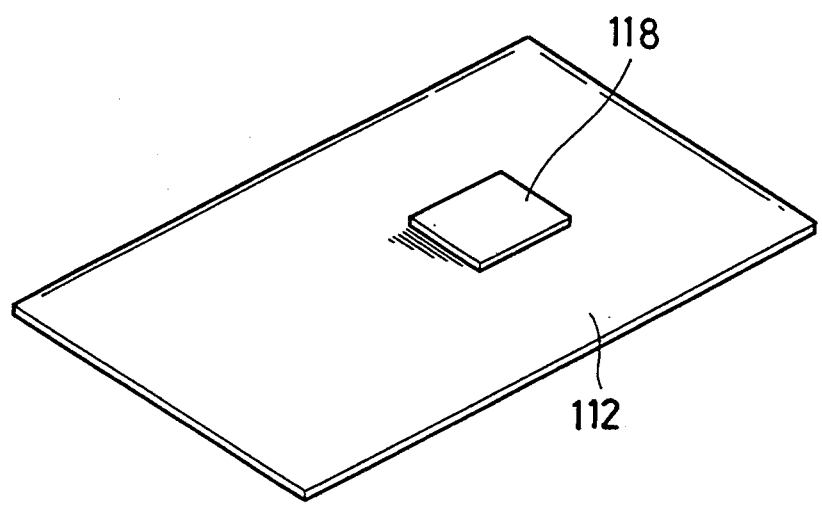
FIG. 12 is a schematic perspective view showing one embodiment of a phosphor sheet for practicing the sheet article containing system according to the fourth aspect of the present invention.

FIG. 12 is a schematic perspective view showing the phosphor sheet 112, as viewed from the back face. In the present invention, the back face of the phosphor sheet 112 is the face opposed to the recording layer.

The phosphor sheet 112 is constructed by laminating a storage fluorescent layer over a substrate of polyethylene telephthalate. On the back face of the phosphor sheet 112, there is adhered the sheet magnetic member 118 which is magnetically attracted by the electromagnet 116 arranged on the cassette loader 120 of the later-described reading apparatus 110. Here, the sheet magnetic member 118 is arranged on the back of the phosphor sheet 112 so that it raises no obstruction to the image recording and reading operations of the phosphor sheet 112.

In the containing system according to the fourth aspect of the present invention, the phosphor sheet 112 contained in the cassette 114 can be held, and the cover 18 of the cassette 14 can be closed by attracting the sheet magnetic member 118 and the electromagnet 116 of the cassette loader 120 to each other.

These operations will be described in detail hereinafter.

The sheet magnetic member 118 should not be especially restricted but may be so suitably selected in accordance with the electromagnet 116 arranged on the reading apparatus 110 from a magnet or an iron foil to be attracted by the electromagnet 116 as can establish an attraction (a magnetic force) stronger than the falling force resulting from the Weight of the phosphor sheet 112. Moreover, the shape and thickness of the magnetic member 118 should not be especially restricted but may be suitably set in accordance with the electromagnet 116.

In the present invention, moreover, the magnetic material arranged on the back face of the phosphor sheet 112 should not be restricted to the sheet magnetic member 118 of the shown embodiment, but its shape and thickness may be suitably set like before in accordance with the electromagnet 116.

As in the aforementioned phosphor sheet 92, the method of fixing the sheet magnetic member (or the magnetic material) on the phosphor sheet 112 should not be especially restricted but may be exemplified by any of the various known methods such as the method of adhering it with various adhesives or adhesive tapes or the method of forming a magnetic layer by the various sheet forming methods. Moreover, the substrate of the phosphor sheet 112 may be mixed with a magnetic material or a magnet.

Incidentally, the position to be arranged with the sheet magnetic member 118 should not be restricted to the rear end portion of the shown embodiment but may be selected from suitable positions in accordance with the position of the electromagnet 116.

This phosphor sheet 112 is contained in the cassette 114 and loaded in the reading apparatus 110, as has been described before with reference to FIG. 10.

In the reading apparatus 110, the cassette 114 is loaded through the loading slot 40 in the cassette loader 120 such that the end face 14 of the phosphor sheet 112 formed with the ejection and insertion slot is positioned down, and is support in a predetermined position by the support rollers 42.

When the cassette 114 is loaded, its cover 18 is opened as in the foregoing embodiment shown in FIG. 9.

Since the phosphor sheet 112 is held in the cassette 114 by the attraction through the cassette 114 between the electromagnet 116 and the sheet magnetic member 118 (in the same state as shown in FIG. 3(b)), it will not fall even if the cover 18 is opened.

If the cover 18 is opened, the phosphor sheet 112 is ejected from the cassette 114 by the ejection roller 44, as in the embodiment of FIG. 9, and is conveyed to the reading unit 34, in which its radiation image information are read out. Then, the phosphor sheet 112 is conveyed to the eraser 38, in which the radiation image information residing even after the reading operation are erased.

The phosphor sheet 112 thus having its residing radiation image information erased in the eraser 38 is further conveyed upward, while being guided by the guide member 48, by the paired rollers 52 and 46 until it is inserted from the end face 14 and contained in the cassette 114.

Here, the insertion of the phosphor sheet 112 into the cassette 114 is accomplished by the containing mechanism of the present aspect.

Specifically, the phosphor sheet 112 is at first conveyed upward by the paired rollers 46 and is inserted into the cassette 114.

Figure 13:
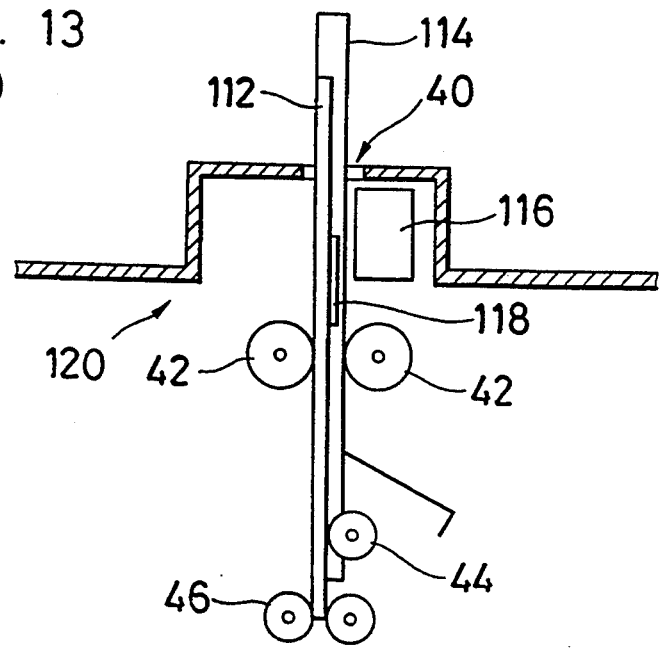
FIG. 13 is a conceptional diagram showing the operations when the sheet article containing system according to the fourth aspect of the present invention is practiced with the radiation image information reading apparatus shown in FIG. 10 and the phosphor sheet shown in FIG. 12.
Figure 13:
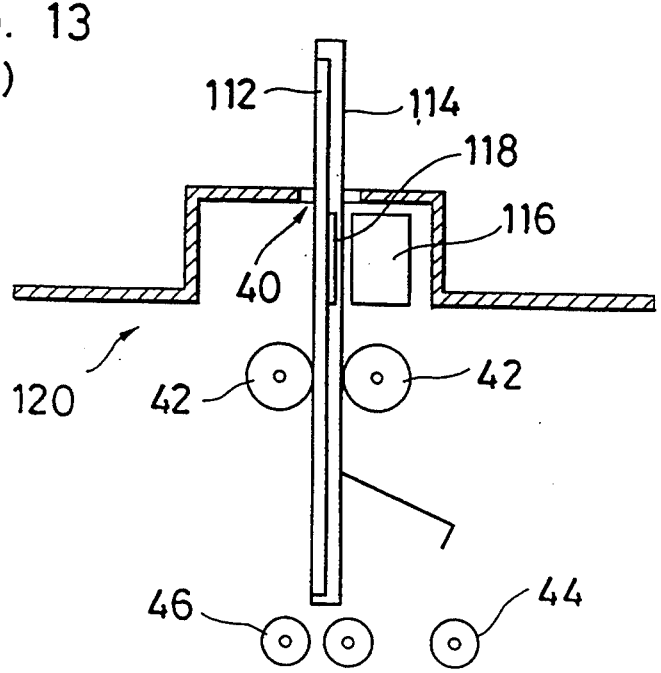

When the phosphor sheet 112 is inserted to some stroke into the cassette 114 by the paired rollers 46, the ejection roller 44 comes into abutment against the phosphor sheet 112, as shown in FIG. 13(a), to rotationally convey the phosphor sheet 112 upward so that the phosphor sheet 112 is completely contained in the cassette 114 while being clamped with the cassette 114.

When the phosphor sheet 112 is contained in the cassette 114, the electromagnet 116 is driven to attract the sheet magnetic member 118 through the cassette 114.

Then, the ejection roller 44 leaves the phosphor sheet 112 and restores its original position, as shown in FIG. 13(b). Since, however, the electromagnet 116 attracts the sheet magnetic member 118, the phosphor sheet 112 is held in the cassette 114 but will not fall.

When the ejection roller 44 returns to the original position, the cover 18 is closed by the closing means (not shown), and then the electromagnet 116 is deenergized so that the cassette 114 containing the erased phosphor sheet 112 can be unloaded from the reading apparatus 110. Here, the cover 18 may be closed under the operation of the pair of the support rollers 42 when the cassette 114 is unloaded from the reading apparatus 110, and then the electromagnet 116 may be deenergized.

The electromagnet 116 to be applied to the containing mechanism of the present aspect should not be especially restricted but can be exemplified by any of the known various ones.

Moreover, the magnetic force of the electromagnet 116 may be so suitably set in accordance with the size of the phosphor sheet 112 and the kind of the sheet magnetic member 118 as to establish an attraction (a magnetic force) overcoming the falling force resulting from the weight of the phosphor sheet 112.

The sheet article containing system according to the fourth aspect of the present invention is basically constructed as described above.

Next, the sheet article containing cassette according to the second aspect of the present invention will be described in the following.

In the cassette of the second aspect of the present invention, a push member having a slide mechanism is brought manually or automatically into contact to push the opposite face to the ejection slot of a sheet article thereby to eject the sheet article partially or wholly from the ejection slot. The sheet article can be ejected from the cassette or conveyed to the reading apparatus such that; its front end side is bitten by the conveyor rollers when the sheet article is ejected.

According to the cassette of the present aspect, moreover, the phosphor sheet can be reliably held in the cassette when not ejected, even in case the cassette containing the phosphor sheet is loaded in the vertical position (with its ejection slot down) in the radiation image information reading apparatus. At the ejection time, on the other hand, the phosphor sheet can be partially ejected to the conveyor roller by the aforementioned push member of the cassette and further to the reading apparatus, for example, by the conveyor roller so that it can be ejected without fail.

The cassette is preferably structured such that the holding mechanism holds the sheet article when the push member is at the standard position, and releases its holding of the sheet article when the push member is at the sheet ejection position other than the standard position.

Therefore, the cassette incorporating the push member and the conveyor rollers are operated together whereby the sheet article can be ejected or contained.

Therefore, the sheet article can be ejected and contained in the cassette which is loaded in the horizontal or vertical position in such an apparatus as a radiation image information reading apparatus by applying the sheet article containing cassette of the present aspect. Therefore, not only the phosphor sheet ejection mechanism of the reading apparatus can be simplified, but also the need to move the cassette can be eliminated so that the cassette can automatically contain a sheet article while being loaded in the horizontal or vertical position, thus making it possible to enhance operational ease.

Figure 14:
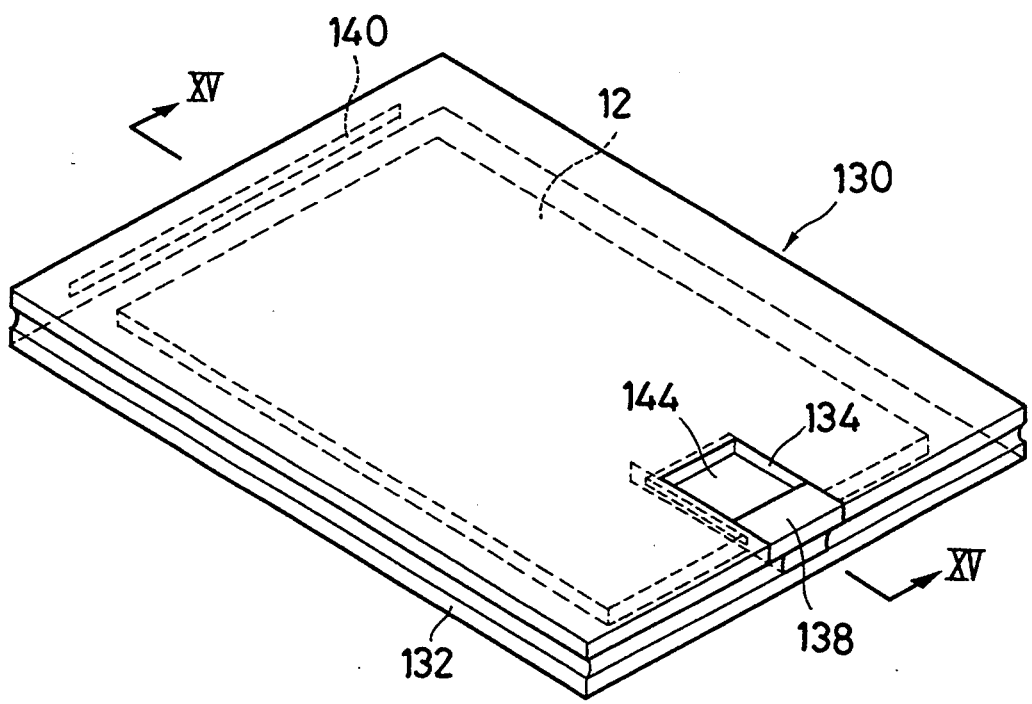
FIG. 14 is a schematic perspective view showing one embodiment of a sheet article containing cassette according to a second aspect of the present invention.
Figure 15:
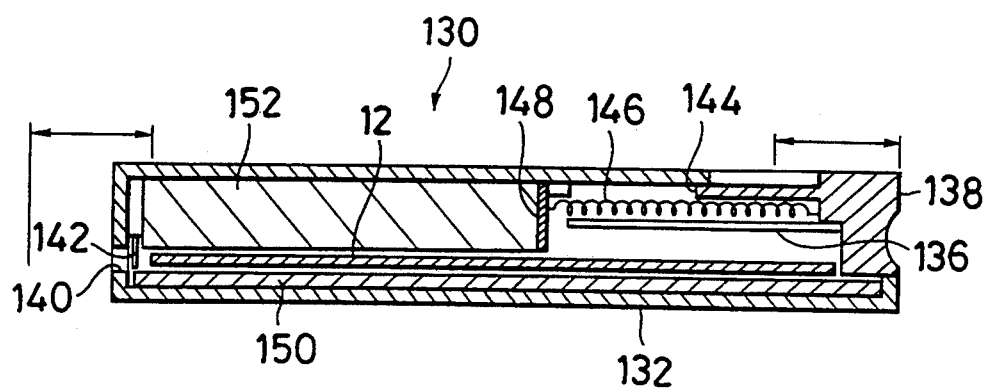
FIG. 15 is a sectional view taken along line XV—XV of FIG. 14.

FIGS. 14 to 16 show one embodiment of the case, in which the cassette according to the present invention is applied to one for containing the phosphor sheet. In the following description, the direction, in which the phosphor sheet is to be ejected from the cassette, is termed as the "front end portion" of the phosphor sheet, and the opposite side is termed as the "rear end portion". In the following description, too, the parts shared with the foregoing first aspect, the third aspect and the fourth aspect of the present invention are designated at the identical reference numerals, and their detailed descriptions will be omitted.

A cassette 130, as shown in FIG. 14, is constructed of a casing 132 for containing the phosphor sheet 12. The casing 132 is notched at 134 at portions of its top and side faces corresponding the rear end portion of the phosphor sheet 12 contained. In the space defined by the notch 134, there is disposed a push member 138 which is made slidably movable on a guide member 136 (as better seen from FIG. 16) such as rails to abut against and push the rear end portion of the phosphor sheet 12. The casing 132 is formed, at its end face opposed to the side arranged with the push member 138, with an ejection slot 140 which is sized to eject the phosphor sheet 12.

On the inner wall in the vicinity of the ejections lot 140 of the casing 132, moreover, there is disposed a light-shielding member 142 such as a light-shielding brush having a light-shielding function, as shown generally in section in FIG. 15.

The casing 132 is made of any of the known various materials such as various resins or metals such as aluminum. The notch 134 formed in the casing 132 is covered, as shown in FIG. 14, with a tongue member 144 extended from the push member 138 to have a predetermined size thereby to shield the back face of the phosphor sheet 12. However, this tongue member 144 of the push member 138 may be omitted. Then, the surface of the phosphor sheet 12 stored and recorded with the radiation image information is not influenced in the least even if the back face of the phosphor sheet 11 is exposed to the outside by omitting the tongue member 144.

The push member 138 will be described in more detail with reference to FIG. 15 presenting a section taken along line XV—XV of FIG. 14 and FIG. 16 taken from the end face of the push member 138.

In the shown embodiment, the push member 138 has not only an abutting face for abutting against and pushing the rear end portion of the phosphor sheet 12 and sliding faces for sliding over the guide members 136 composed of two rails, for example. In case no external bias is applied to the push member 138 in the initial position, as shown in FIG. 15, a bias member 146 of a compression spring or the like biased to return the push member 138 to the initial position is arranged between the push member 138 and a stopper 148 disposed in the casing 132.

The phosphor sheet 12 is contained in the cassette 130 with its recording layer directed toward an elastic member 150.

Figure 3:
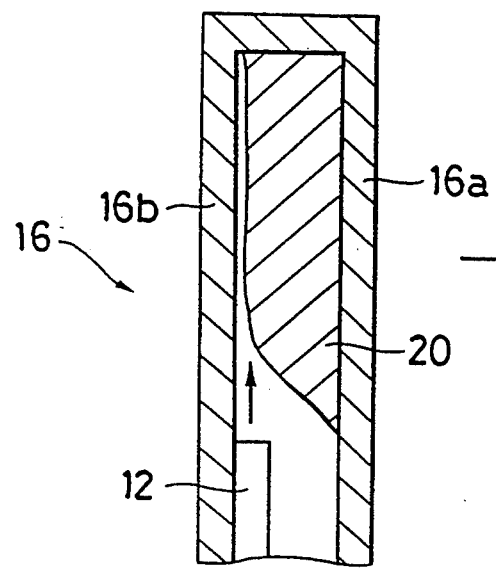
FIGS. 3(a) and 3(b) are is an enlarged sectional views showing a portion of the cassette of FIG. 2 under different use conditions.
Figure 3:
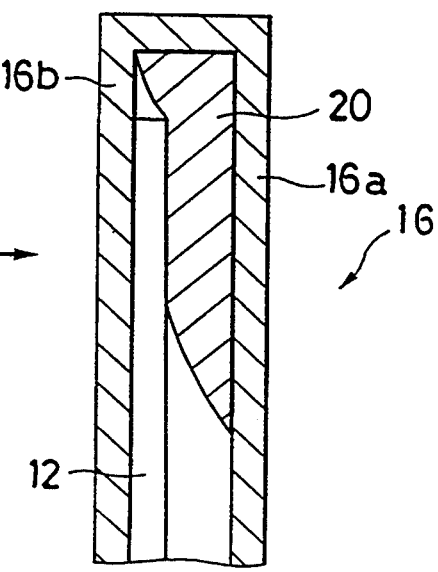

In case, on the other hand, the cassette 130 is held in the vertical position with its ejection slot 140 down, the holding member such as the elastic member 20, as shown in FIG. 3, may be disposed in the casing 132 so that the phosphor sheet 12 may be so held in the cassette 130, as in the aforementioned cassette 10 of the first aspect, as to eject the phosphor sheet 12 only at a desired time from the ejection slot 140.. Then, the phosphor sheet 12 is held between the inner wall of the casing 132 and the holding member.

The inner space of the casing 132 for confining the phosphor sheet 12 may define a space capable of containing the phosphor sheet 12. Since, however, the phosphor sheet 12 in the space may move, while the cassette 130 is being transported, to damage the surface of its recording layer having the fluorescent layer. As shown in FIG. 15, therefore, the movement of the phosphor sheet 12 is suppressed in the cassette 130, and elastic members 150 and 152 may preferably be adhered to the inner face of the cassette 130 so as to prevent its displacement and floating.

These elastic members 150 and 152 are preferably made of an elastic material such as rubber, urethane, sponge or foamed styrol. On the other hand, the elastic member 150 arranged at the side of the recording layer of the phosphor sheet 12 can be omitted if the phosphor sheet 12 has its movement suppressed by the elastic member 152 and its displacement and floating prevented properly.

Moreover, the elastic member 152 is arranged at the side of the back face with respect to the recording layer of the phosphor sheet 12 so that it raises no obstruction to the operation of recording the radiation image information. Moreover, the elastic member 150 may preferably be notched in advance in a portion corresponding to the portion, in which the push member 138 of the elastic member 150 can move, so as to smoothen the movement of the push member 138.

In the cassette 130 of the shown embodiment of the present invention, the surface of the elastic member 150 may preferably be arranged with a protective member for the recording layer of the phosphor sheet 12 because it abuts against the recording layer. The protective member can be exemplified by any of the known various materials such as Toray PEF (which is produced by Toray) or the TYVEK (which is produced by Du Pont) if it has such a suitable smoothness as will not damage the recording layer of the phosphor sheet 12 contacted thereby.

Figure 17:
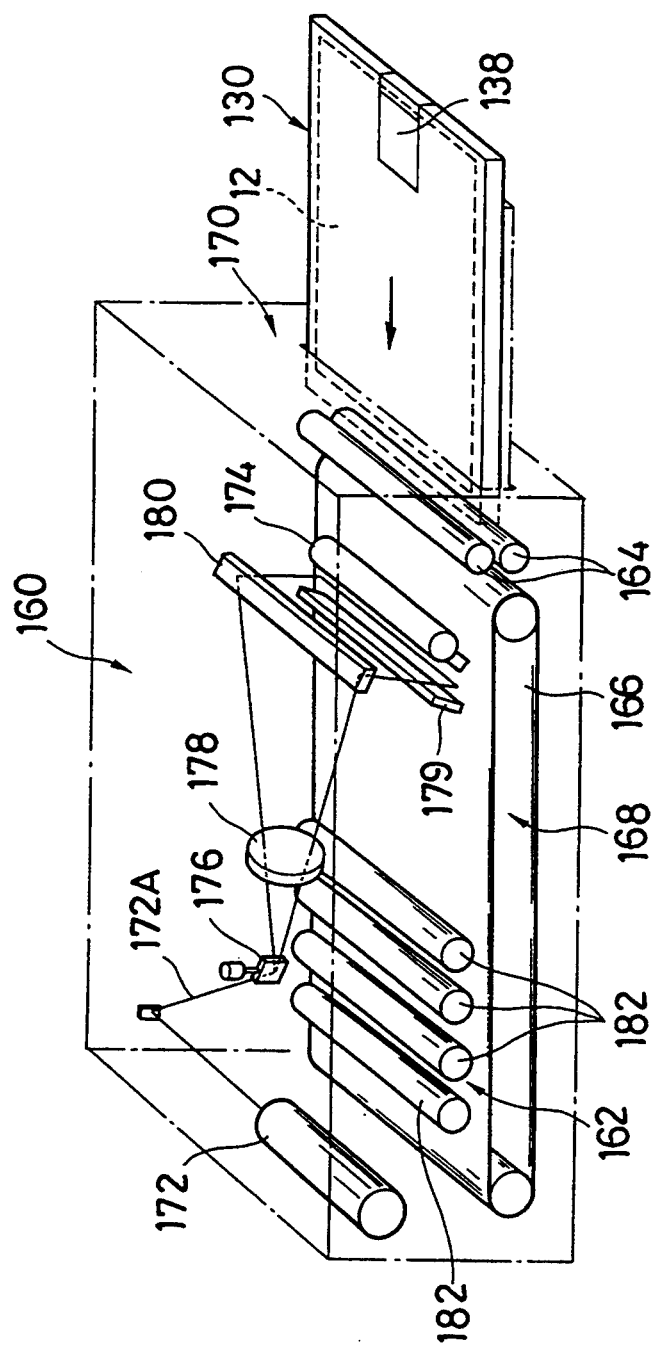
FIG. 17 is a schematic perspective view showing a radiation image information reading apparatus using the sheet article containing cassette shown in FIG. 14.
Figure 18:
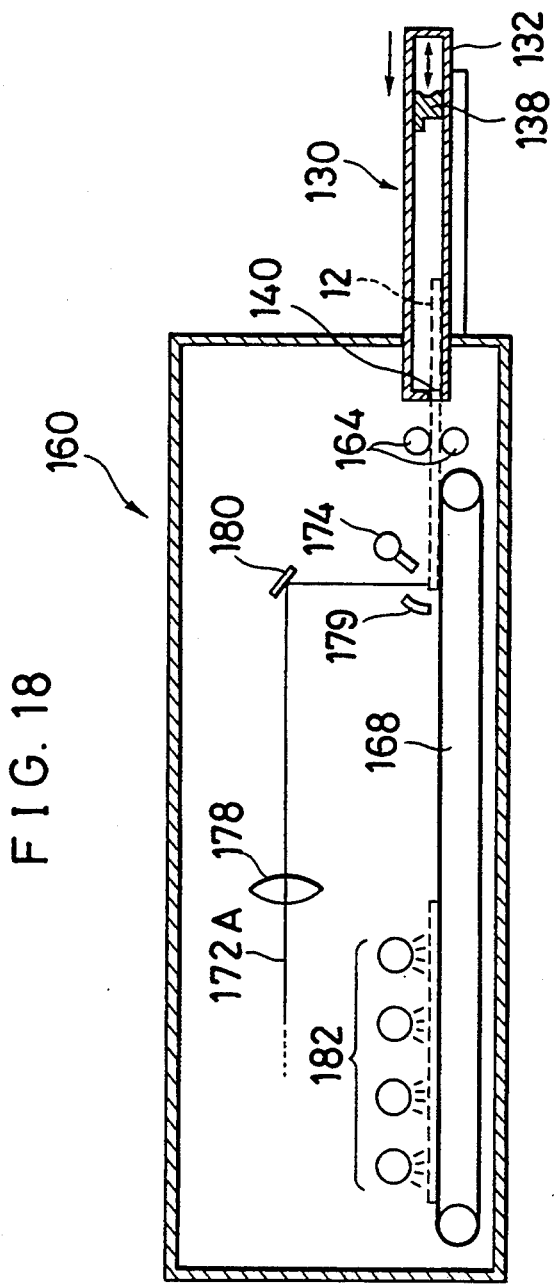
FIG. 18 is a schematic sectional view showing the radiation image information reading apparatus shown in FIG. 17.

FIG. 17 is a perspective view schematically showing one embodiment of the case, in which the cassette 130 of the present aspect thus far described is loaded in a horizontal position in the reading apparatus, and FIG. 18 is a conceptional side elevation of the same.

The reading apparatus, as shown in FIG. 17, is constructed to include: a cassette holding member for holding the cassette 130 removably; a reading unit 160 for reading the image information stored and recorded in the phosphor sheet 12; and an eraser 162 for erasing the image information residing in the phosphor sheet 12 after the reading operation. In the apparatus, there is disposed phosphor sheet conveyor means 168 which is composed of a pair of rollers 164 and an endless belt 166 for receiving the phosphor sheet 12 ejected from the inside of the cassette 130 and conveying it to the reading unit 160 and the eraser 162.

The cassette 130 containing the phosphor sheet 12, which has been photographed in the not-shown external camera, is loaded in the horizontal position, as indicated by arrow in FIG. 17, in a cassette loading unit 170.

The cassette 130 is constructed like before to include: the casing 132; the ejection slot 140 formed in the leading end, as taken in the inserting direction into the cassette loading unit 170; and the push member 138 which is disposed and made slidable at the trailing end in the inserting direction. When the cassette 130 is loaded in the cassette holding member, the push member 138 is moved in the inserting direction manually or by another member. As this push member 138 moves in the inserting direction, the phosphor sheet 12 abutting against the push member 138 slides in the cassette 130 so that it is ejected to a stroke substantially equal to the movement of the push member 138 from the ejection slot 140.

The phosphor sheet 12 having its portion ejected from the ejection slot 140 in accordance with the movement of the push member 138 is taken into the paired rollers 164 so that it is completely ejected from the cassette 130, until it is delivered into the reader 160 by the paired rollers 164 and the endless belt 166.

In the reader 160, the phosphor sheet 12 stored and recorded with the image information is scanned with an excited beam 172A emitted from a laser beam source 172. The luminescence-extinct light emitted from the phosphor sheet 12 by the scanning is photoelectrically read and converted into electric image signals for outputting a visible image by an elongated photomultiplier 174 acting as photoelectric reading means. In the same Figure: reference numeral 176 designates an optical deflector such as a galvanometer mirror; numeral 178 a scanning lens such as an fθ lens; numeral 180 a mirror for reflecting and introducing the excited beam 172A into the phosphor sheet 12; and numeral 179 a mirror for reflecting and introducing the luminescence-extinct light into an optical guide for the photomultiplier 174.

The phosphor sheet 12 having been read by the reader 160 is conveyed by the endless belt 166 to the eraser 162, in which it is erased by the irradiation of an erasing light source 182. Then, the phosphor sheet 12 is conveyed to the cassette 130 by the outward run of the endless belt 166 opposed to the delivery direction. Then, the phosphor sheet 12 is inserted from the ejection slot 140 into the cassette 130 by the aid of the paired rollers 164. If the phosphor sheet 12 cannot be completely inserted into the cassette 130 even with the aid of the paired rollers 164, the cassette 130 may be removed from the cassette loader 170, and a protruding portion of the phosphor sheet 12 may be manually inserted into the cassette 130.

Although one embodiment of the second aspect of the present invention has been described hereinbefore, the present aspect should not be restricted thereto.

In the foregoing embodiment, the push member 138 is enabled to move along the notch 134 by notching the top face and the side face of the rear end portion of the casing 132. If, however, the casing 132 has a sufficient height, the notch 134 may be formed only in the side face of the rear end portion, as shown in FIGS. 19 and 20, so that the push member 138 may enter the casing 132 from the side of the rear end portion to push and move the rear end portion of the phosphor sheet 12. However, the guide member 136 may preferably be bulged to fit in a recess which is formed in the top face of the push member 138.

In case, moreover, the bias member 146 is disposed in the moving direction of the push member 138 so that no external force is applied to the push member 138, it may allow restoration of the initial position, as shown in FIG. 19. This modification is advantageous in that the shape of the push member 138 is more simplified than that of the push member 138 of the first embodiment and that less light will invade into the casing 132.

Moreover, the positions for the notch 134 and the push member 138 should not be restricted to those of the shown embodiment but may be located at any position of the rear end portion of the casing 132 of the cassette.

The cassette 130 of the present aspect should not have its application restricted to the aforementioned reading apparatus using the horizontal loading but can be applied to the reading apparatus, which is loaded while having its ejection slot 140 directed down, as shown in FIG. 9.

In this may, when the cassette 130 is held in the vertical position with the ejection slot 140 directed down, it is preferred to provide a holding member shown in FIGS. 3(a) and 3(b) so that the sheet is ejected from the ejection slot 140 only when desired, as in the cassette 10 of the first aspect described in the foregoing pages. As shown in FIGS. 3(a) and 3(b), the elastic member 20 can be used as a holding member for the phosphor sheet 12. To provide the elastic member in the casing 132 of the cassette 130 of the present aspect, it should be provided at portions of the casing 132 other than a cutout portion 134 thereof. In more detail, the elastic member is provided in the casing 132 on the inner wall of the back face of the cassette 130 as a holding member for the phosphor sheet 12. That is, the rear end portion of the sheet 12 is supported by this holding elastic member and the member on the recording plane of the casing 132 whereby the sheet is held with a holding force larger than a falling force resulted from the weight of the phosphor sheet 12. To release the holding of the phosphor sheet 12, the pressure force of the push member 138 is use, thus making it possible to eject the phosphor sheet 12 from the ejection slot 140 as shown in FIGS. 3(a) and 3(b). In this case, the push member 138 functions as mean for releasing holding with the holding member.

That is, when the rear end portion of the phosphor sheet 12 held by the elastic member which functions as holding means is pushed down manually or with other means, it is released from its holding with the elastic member 20. Therefore, the phosphor sheet 12 is ejected from the ejection slot 14 of the cassette 130, and the leading end thereof is held by a pair of rollers (refer to FIG. 9). When the push member 138 is released from a bias state, it returns to the original position with bias members such as compression coil springs.

After ejection, the phosphor sheet 12 having being read is contained in the cassette 130 again with a pair of rollers 44 shown in FIG. 9.

Figure 21:
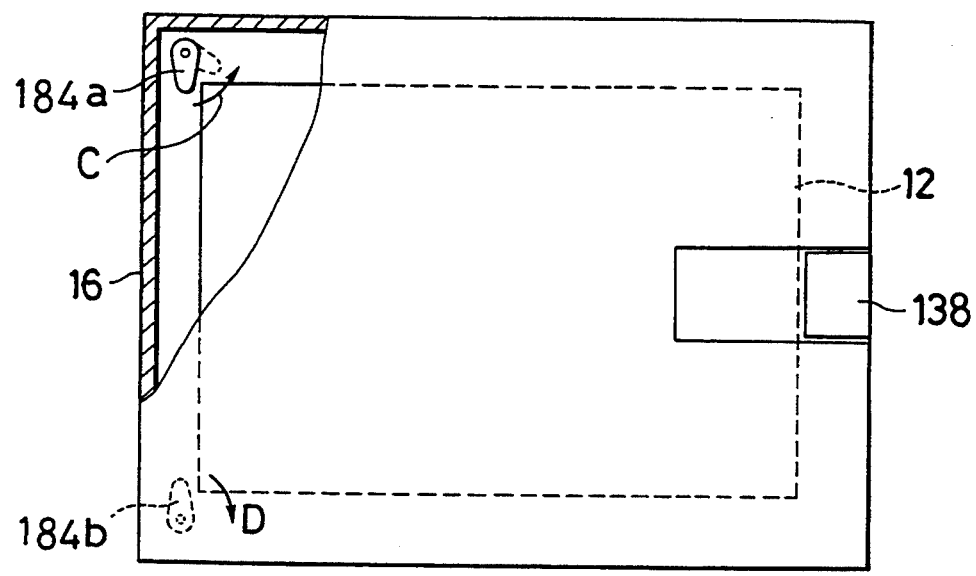
FIG. 21 is a partially cutaway view showing another embodiment of the sheet article loading cassette according to the second aspect of the present invention.

In the description thus far made, the phosphor sheet 12 is held in the cassette 130 by the holding means of the elastic member 20 in case the cassette of the present aspect is used with the reading apparatus having the downward ejection slot 140. Despite of this fact, however, holding means, as shown in FIG. 21, can be applied to the cassette of the present aspect.

The holding means of the shown embodiment is equipped with pawls 184a and 184b which are turnably supported by pins through coil springs. These pawls 184a and 184b are so supported by bias members such as the coil springs that their faces contacting with the phosphor sheet may always be horizontal with respect to their end faces.

Since the pawls 184a and 184b are biased by the coil springs, they prevent the phosphor sheet 12 contacting therewith from being ejected from the ejection slot 140, in case the phosphor sheet 12 is inclined from the horizontal position with its ejection slot 140 down. In case, however, the pawls 184a and 184b are released by the unlocking pin (not shown), the phosphor sheet 12 is easily ejected from the ejection slot 140.

Figure 22:
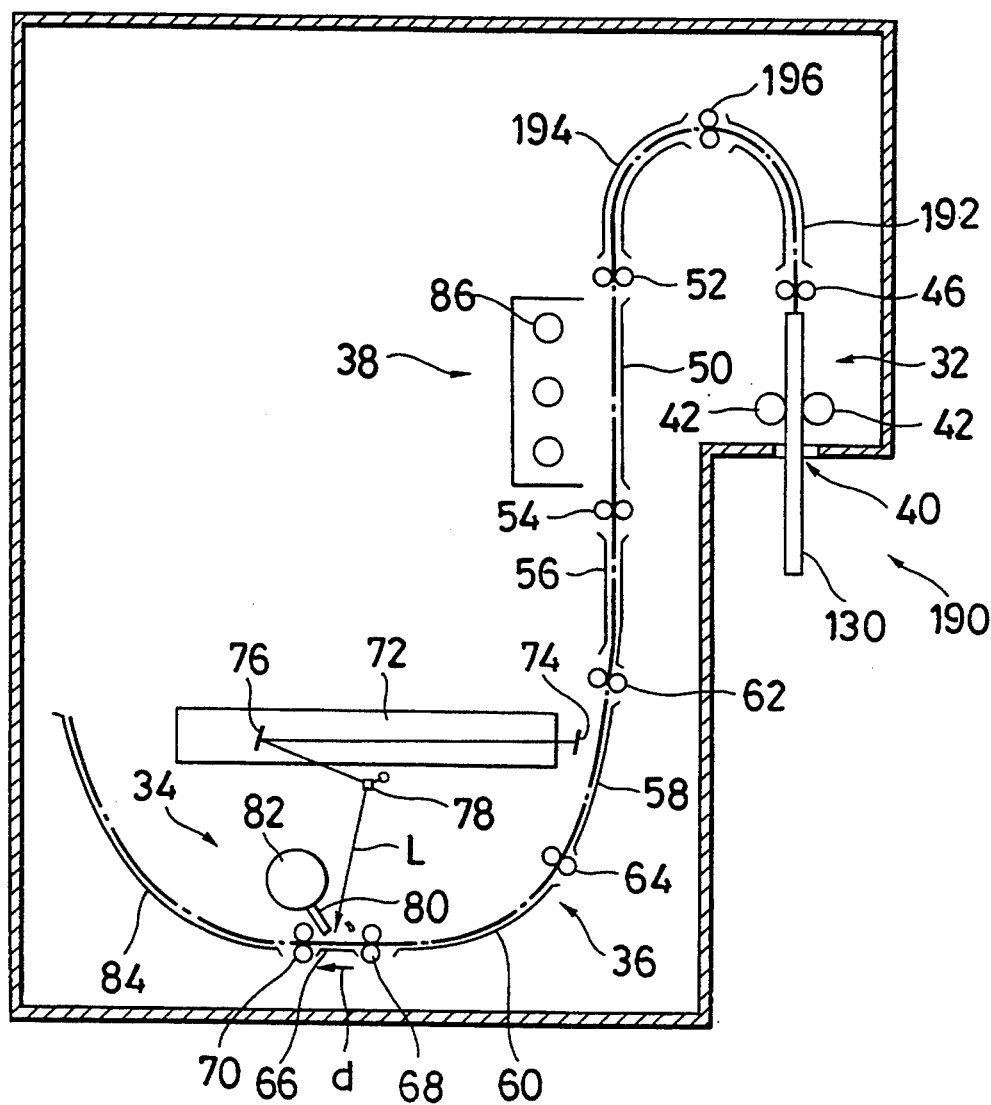
FIG. 22 is a schematic sectional view showing still another example of the radiation image information reading apparatus using the sheet article containing cassette according to the second aspect of the present invention.

On the other hand, the reading apparatus using the cassette of the present aspect can be exemplified by an apparatus, in which the cassette is to be loaded upward, as shown in FIG. 22. Since this reading apparatus has a construction substantially identical to the internal structure of the apparatus shown in FIG. 9, the common parts are designated at the identical reference numerals, and their detailed descriptions will be omitted.

This reading apparatus is additionally equipped with guide members 192 and 194 and a pair of rollers 196. This reading apparatus 190 is loaded with the cassette 130 by inserting it upward, and the cassette 130 is held by the support rollers 42. In case of application to the reading apparatus 190, the cassette 130 has its ejection slot 140 opened upward so that it need not be equipped with any holding member for preventing the phosphor sheet 12 from falling from the cassette 130. Another advantage is that the phosphor sheet 12 can be completely contained in the cassette 130 by making use of the weight thereof even in case the phosphor sheet 12 is returned to the cassette 130 after its reading and erasing steps.

In the aforementioned example of each aspect, the stimulable phosphor sheet is provided as a typical example of sheet article, and the phosphor sheet containing cassette as a typical example of the sheet article containing cassette. However, the present invention should not be limited to these. The sheet article may be such a sheet article as an X-ray film, and the cassette may be any container which can contain the sheet article to protect it and shade the light from it.

As obvious from the above explanation, according to the sheet article containing cassette of the first aspect of the present invention, even when the cassette contains such a sheet article as a phosphor sheet and is loaded in the radiation image information reading apparatus with the open area (ejection slot) down, it can contain and hold a sheet article again while being loaded after the sheet article contained is ejected.

According to the sheet article containing cassette of the second aspect of the present invention, a push member having a slide mechanism is brought manually or automatically into contact to push the opposite face to the ejection slot of such a sheet article as a phosphor sheet whereby the sheet article is partially or wholly from the ejection slot. The sheet article can be ejected from the cassette or conveyed to the reading apparatus such that its front end side is bitten by the conveyor rollers when the sheet article is ejected.

According to the sheet article containing system of the third aspect of the present invention, even if the cassette is loaded in the radiation image information reading apparatus with the ejection and input slots directed down, the cassette can contain and hold a phosphor sheet while being loaded in the apparatus.

According to the sheet article containing system of the fourth aspect of the present invention, even if the cassette is loaded in the radiation image information reading apparatus with the open area (ejection slot) down, it can contain a phosphor sheet while being loaded in the apparatus and can be taken out from the apparatus with the open area being closed with a cover.

Therefore, the sheet article can be ejected and contained in the cassette which is loaded in the horizontal or vertical position in such an apparatus as a radiation image information reading apparatus by applying either the sheet article containing cassette or the sheet article containing system of the present aspect. Therefore, not only the phosphor sheet ejection mechanism of the radiation image information reading apparatus can be simplified, but also the need to move the cassette can be eliminated so that the cassette can automatically contain a sheet article while being loaded in the horizontal or vertical position, thus making it possible to enhance operational ease.

Although the sheet article containing cassette and the sheet article containing system of the present invention have been described in connection with the embodiments thereof, the present invention should not be restricted thereto but can be modified and changed in various manners within the scope of the gist thereof.

The cassettes according to fifth and sixth aspect of the present invention are hereinafter described by referring to FIGS. 23 to 35. The cassettes according to fifth and sixth aspect of the present invention are provided with a sheet article-fastening means for reliably fastening the sheet article within the cassette casing by compressive or frictional contact between the sheet article-fastening means and the sheet article as in the case of the cassettes of first aspect of the invention. The cassettes according to fifth and sixth aspect of the present invention, however, are additionally provided with a mechanism for releasing the sheet article from such a compressive contact with the sheet-article fastening member upon completion of the loading of the cassette in the apparatus in which the sheet article which had been accommodated in the cassette is processed.

First, the cassette according to fifth aspect of the present invention is described.

In the above-described cassette according to first aspect of the present invention, the sheet-form image information recording medium such as the stimulable phosphor sheet (which may be sometimes referred to as a sheet article) is frictionally fastened in position within the casing by the sheet article-fastening means such as the elastic member (FIGS. 2, 3(a) and 3(b)) or the leaf spring (FIG. 4), which presses the sheet article against one wall of the casing. Therefore, even when the cassette is loaded into the apparatus such as the radiation image information reading apparatus in substantially vertical direction with the opening defined in the cassette casing facing downward, the sheet article would be reliably accommodated within the cassette being frictionally secured in position within the casing. Such provision of the sheet article-fastening means is quite favorable even when such vertical loading system is not adopted since such sheet article-fastening means will prevent the sheet article from undergoing undesirable movement within the casing.

Provision of such a sheet article-fastening member within the casing, however, may result in an increased resistance in the unloading (and the loading) the sheet article from (and to) the casing since the sheet article has to be moved against the frictional force applied by such a sheet article-fastening means. A larger torque would be consequently required for the means used for the unloading (and the loading) the sheet article from (and to) the cassette (see FIG. 25, roller 44), leading to an increased cost of the means.

Accordingly, use of the cassettes according to the fifth aspect of the invention as shown in FIGS. 23 to 30 would be preferred when it is desired to reliably hold the sheet article within the casing as in the case of the cassette according to the first aspect of the present invention, and simultaneously, use a sheet article-unloading (and loading) means of a smaller torque.

The sheet article-fastening means of the cassette according to the fifth aspect of the present invention comprises a clip means having a biasing mechanism, and the clip means is brought into compressive contact with the sheet article at one point to press the sheet article against one wall of the casing by the biasing mechanism. When the biasing mechanism of the clip means is deformed, the sheet article is released from the compressive contact with the clip member.

In the cassette according to the fifth aspect of the present invention, a cassette-securing mechanism which is generally provided with the apparatus into which the cassette is loaded is utilized for this purpose, namely, for releasing the sheet article from the compressive contact with the clip member. More illustratively, the apparatus into which the cassette is loaded is generally provided with a mechanism for securing the cassette in position to thereby prevent erroneous withdrawal of the cassette from the apparatus while the sheet article which had been accommodated in the cassette is being processed in the apparatus. Such a cassette-securing mechanism typically comprises a combination of a through hole defined in the casing of the cassette and a cassette-securing pin provided in the apparatus which is to be inserted into the through hole of the casing once the cassette is properly loaded in the apparatus. In the cassette according to the fifth aspect of the invention, the cassette-securing pin is used to deform the biasing mechanism of the clip means to thereby release the sheet article which had been in compressive contact with the clip means by the function of the biasing mechanism.

Once the sheet article has been released from such a compressive contact with the clip means, it can be readily pulled out of the cassette with a small frictional force, enabling the use of a relatively inexpensive driving means for the unloading (and the loading) of the sheet article from (and to) the cassette.

In addition, the cassette of the fifth aspect of the invention utilizes the mechanism which is generally provided with the apparatus into which the cassette is loaded for its sheet article-releasing mechanism. Such utilization of the already existing mechanism will avoid unduly increased production cost since no additional member or mechanism has to be newly added to the apparatus.

Figure 23:
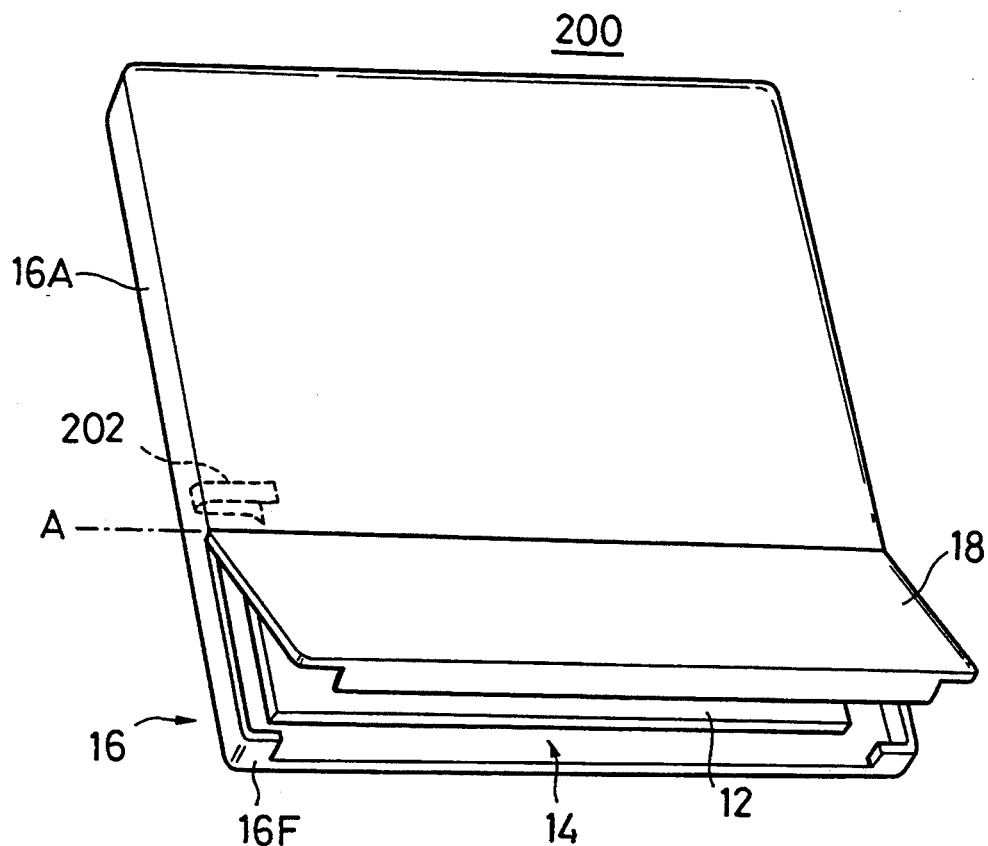
FIG. 23 is a perspective view of a cassette according to fifth aspect of the present invention with a sheet article accommodated in the cassette.
Figure 24:
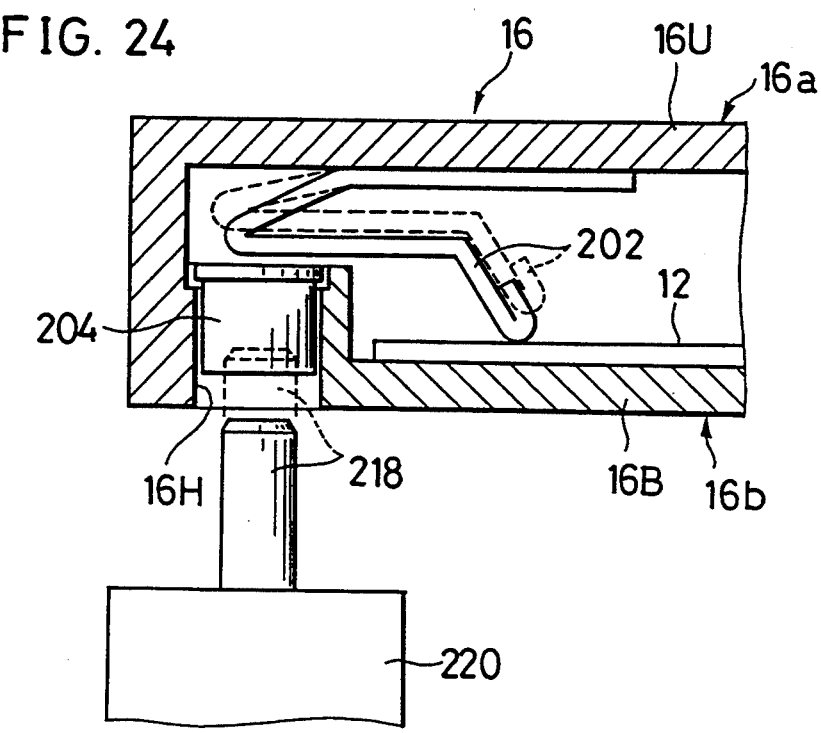
FIG. 24 is a transverse partial cross sectional view of the cassette of FIG. 23 showing a sheet article-fastening means according to first embodiment of the fifth aspect of the invention.

The cassette according to fifth aspect of the present invention is hereinafter described in further detail by referring to FIGS. 23 to 30. Referring to FIG. 23, a cassette 200 according to first embodiment of the fifth aspect of the invention is shown in its perspective view. FIG. 24 is a transverse cross sectional view of one part of the cassette 200 shown in FIG. 23. As mentioned above, the cassette 200 is adapted to accommodate a sheet article such as a stimulable phosphor sheet 12, which comprises a substrate and a stimulable phosphor layer disposed on the substrate. The cassette 200 comprises an oblong, shallow casing 16 which may be fabricated from a synthetic resin and a cover 18 secured to the casing 16. The casing 16 comprises a top plate 16U (at the side of the back face 16a), a bottom plate 16B (at the side of the front face 16b), two side walls 16A extending in a direction parallel to the longitudinal axis of the casing 16, and a front wall 16F which faces downward in the loading of the cassette 200 into the system in its loading unit, and a rear wall opposite to the front wall 16F. The casing 16 is cut out at least in a part of the front wall 16F to define an opening (end face or ejection slot) 14 to facilitate the unloading and loading of the stimulable phosphor sheet 12 from and to the casing 16. The opening 14 may extend into the top plate 16U of the casing 16. The opening 14 is covered by the cover 18, which is movably secured to the casing 16 so that it can be lifted to allow for the stimulable phosphor sheet 12 to be unloaded and loaded from and to the casing 16 through the opening 14. The cover 18 swivels about a swiveling axis A, which extends substantially parallel to the stimulable phosphor sheet 12. The cover 18 may be secured to the casing 16 in any desired conventional manner, for example, by hinging to the casing 16, or by integrally molding with the casing and folding the molded article along the swiveling axis A. The cover 18 may be fabricated from a synthetic resin or a metal such as aluminum, which may be the same as or different from the casing 16. The stimulable phosphor sheet 12 is accommodated in the cassette 200 with its stimulable phosphor layer side contacting with the bottom plate 16B of the casing 16.

In the interior of the casing 16, there is provided a clip member 202 in the vicinity of one side wall 16A. FIG. 24 is a view from the side of the opening 14 of the casing 16 to illustrate how the clip member 202 is arranged within the casing 16. As shown in FIG. 24, the clip member 202 is fixedly secured at one end to the top plate 16U of the casing 16 on its interior surface. The intermediate portion of the clip member 202 is curved or bent so that the other end of the clip member 202 would protrude toward the bottom plate 16B of the casing 16. The clip member 202 is made of a highly resilient (elastic) material which may be used for leaf springs, and once the stimulable phosphor sheet 12 is accommodated in the cassette 200, the end of the clip member 202 protruding toward the bottom plate 16B would become in compressive contact with the stimulable phosphor sheet 12 on its substrate side until an external force is applied to the clip member 202 to deform the member to thereby release the stimulable phosphor sheet 12 from such a compressive contact.

In the bottom plate 16B of the casing 16, there is defined a circular through hole 16H at a position opposing the bent or curved intermediate portion of the clip member 202. Between the through hole 16H and the clip member 204 is confined a spacer 204 of a substantially columnar shape.

Figure 25:
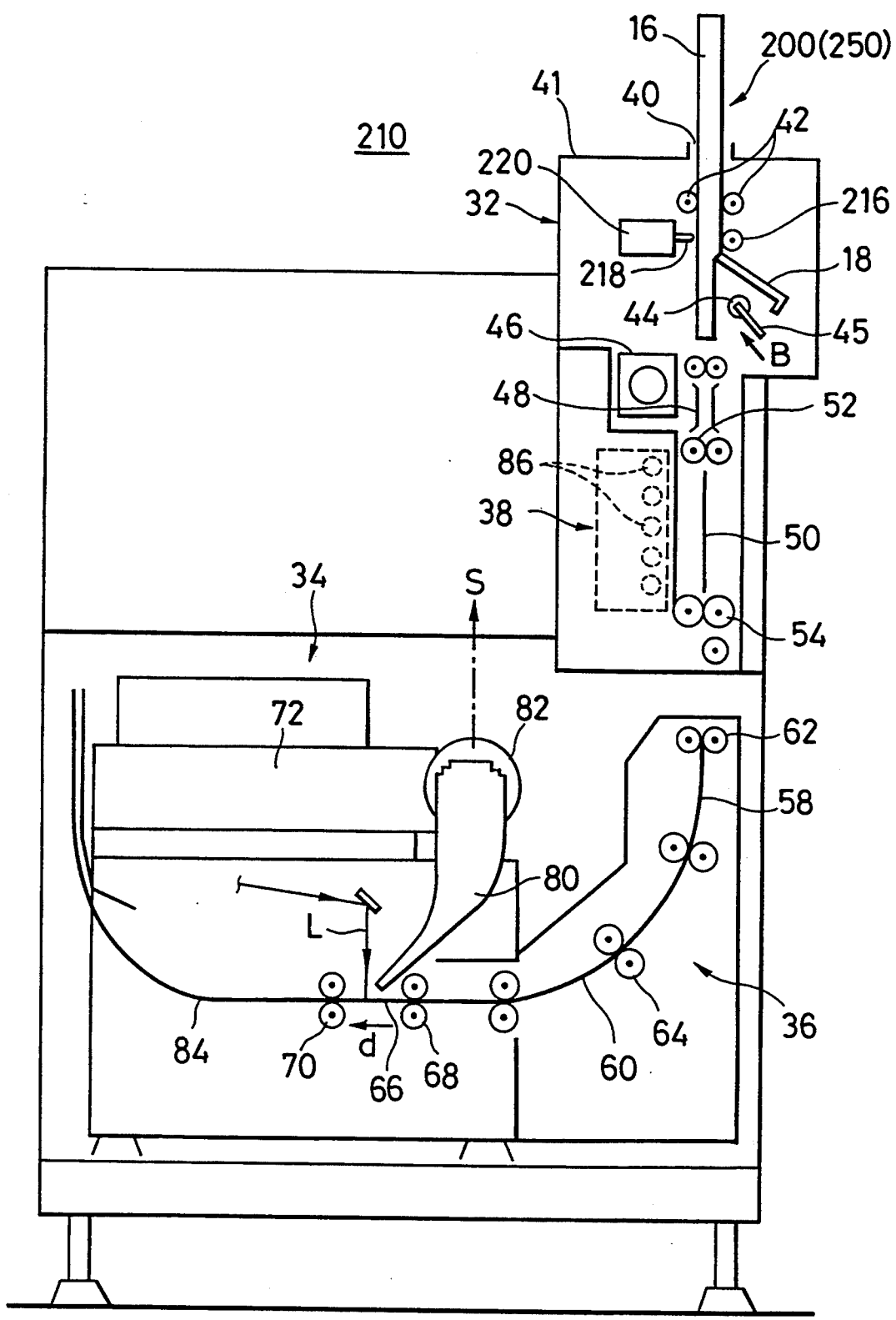
FIG. 25 is a schematic side view of a radiation image information reading apparatus into which the cassette of FIG. 23 is loaded.
Figure 26:
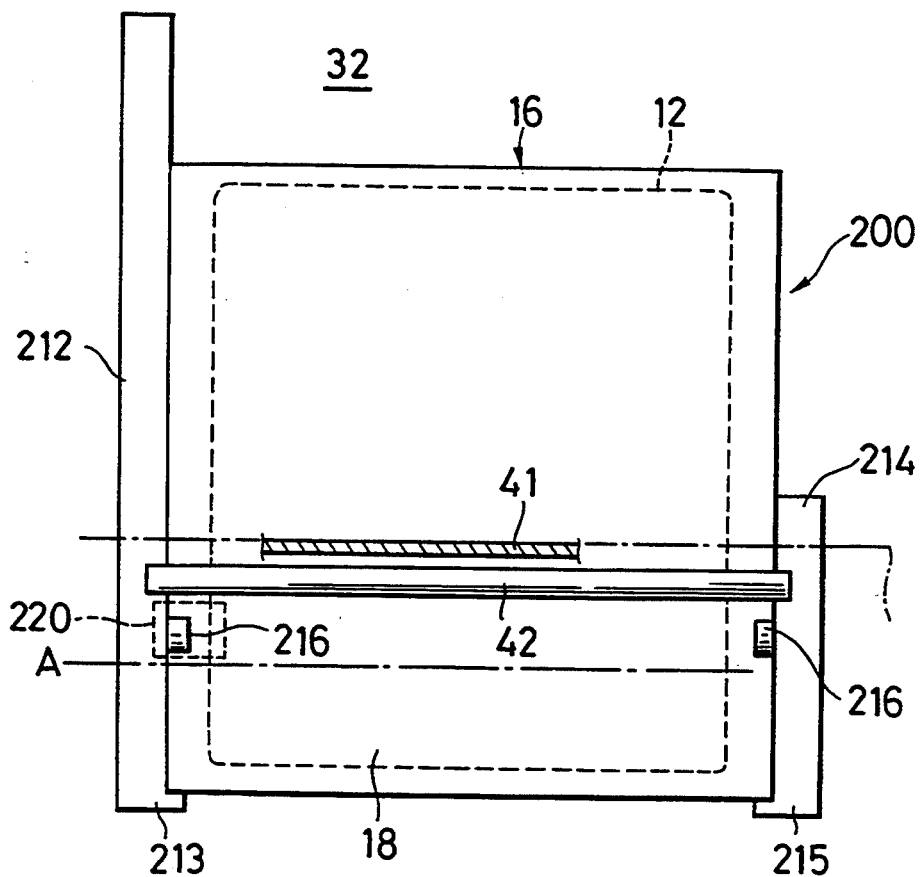
FIG. 26 is a schematic elevational view of a cassette-loading unit of the radiation image information reading apparatus of FIG. 25.
Figure 27:
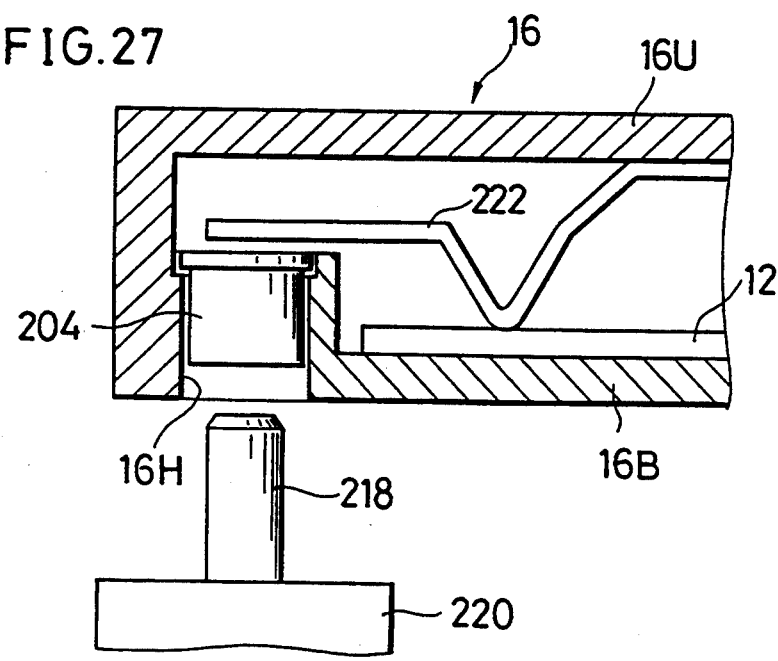
FIG. 27 is a transverse partial cross sectional view of a cassette having provided therein a sheet article-fastening means according to second embodiment of the fifth aspect of the invention.

Referring to FIG. 25, there is shown a schematic side view of a radiation image information reading apparatus 210 with the cassette 200 being inserted into its cassetteloading unit 32 for the purpose of reproducing the image information recorded in the stimulable phosphor sheet 12, and in the cassette 200 is accommodated the stimulable phosphor sheet 12 having recorded therein the radiation image information. Referring to FIG. 26, there is shown the cassette-loading unit 32 of the radiation image information reading apparatus 210 in its elevational view. The image information reading apparatus depicted in FIGS. 25 and 26 is of a construction which is basically the same as the one depicted in FIG. 9, and therefore, like numbers refer to similar parts and no detailed description is additionally given.

It should be noted that, upon transportation of the cassette 200 with the stimulable phosphor sheet 12 accommodated therein in such occasion as the recording of the image information or the reading of the recorded image information, the stimulable phosphor sheet 12 which is pressed against the bottom plate 16B of the casing 16 by the clip member 202 is avoided from undergoing an undesirable movement within the casing 16.

Referring to FIG. 26, the cassette-loading unit 32 comprises a fixedly secured guide member 212 provided for positioning the cassette 200 from its exterior on one side, a fixedly secured guide member 214 provided for positioning the cassette 200 from the other side, and a pair of light-shielding rollers 42 which also function to support the cassette 200.

On each of the guide members 212 and 214 is rotatably secured a lock roller 216. The guide members 212 and 214 are also provided at their lowermost end with a stopper 213 and a stopper 215, respectively. The light-shielding rollers 42 extend beyond the width of the cassette 200, and they are pushed toward each other by a biasing means (not shown) although a stopper (not shown) is provided to define some space between the rollers 42. The radiation image information reading apparatus 210 is also provided with a frame 41 having defined therein an entrance slot 40 for receiving the cassette 200.

In the loading of the cassette 200 in the apparatus 210, the cassette 200 is first inserted downward into the entrance slot 40 with the front wall 16F (transversal end 14) of the casing 16 facing downward, and then constrained into the space or nip defined between the light-shielding rollers 42. The light-shielding rollers 42 will then receive the cassette 200 therebetween by moving slightly remote from each other against the force applied by the biasing member (not shown). After the insertion of the cassette 200 between the rollers 42, the cassette is further inserted until the front wall 16F of the casing 16 becomes in contact with the stoppers 213 and 214 respectively provided on the guide members 212 and 215 at their lowermost ends to reliably hold the cassette 200 in position.

The radiation image information reading apparatus 210 has a cassette-securing pin 218 provided at a position in alignment with the through hole 16H of the casing 16 of the cassette 200 which has been fully inserted to the above-described position. See also FIG. 24. The cassette-securing pin 218 may be protruded and retracted in its axial direction, that is, in horizontal direction in the view of FIG. 25, by an electromagnetic actuator 220. Until the cassette 200 is fully loaded in position in the radiation image information reading apparatus 210, the cassette-securing pin 218 remains withdrawn at the position indicated in FIG. 24 by a solid line so that it would not interfere with the loading of the cassette 200 into the apparatus 210.

Once the loading of the cassette 200 into the radiation image information reading apparatus 210 is completed, the cover 18 is opened as shown in FIG. 25 by an appropriate means (not shown), and a roller arm 45 having a roller 44 mounted on its distal end is moved in the direction shown by arrow B toward the stimulable phosphor sheet 12 accommodated in the cassette 200. Upon contact of the roller 44 with the stimulable phosphor sheet 12 accommodated in the cassette 200, the movement of the roller arm 45 is stopped. In response to the stopping of the roller arm 45, the actuator 220 is turned on to push the cassette-securing pin 218 into the through hole 16H of the casing 16, namely, to the position indicated in FIG. 24 by the broken line.

As will be precisely described later, in the radiation image information reading apparatus 210, the stimulable phosphor sheet 12 will be carried away from the cassette 200, which has been loaded to the above-described predetermined position, for the purpose of subjecting the stimulable phosphor sheet 12 to the image-reading process, and after completing the process, it will be returned to the cassette 200. Therefore, an erroneous withdrawal of the cassette 200 from the apparatus 210 while the sheet 12 is absent from the cassette 200 should be avoided. The cassette-securing pin 218 which has protruded into the through hole 16H of the casing 16 will avoid such an erroneous withdrawal of the cassette 200 from the apparatus 210.

As the cassette-securing pin 218 protrudes into the through hole 16H, it pushes the spacer 204, and in turn, the clip member 202. The clip member 202 then undergoes a deformation to change its shape to the one shown by the broken line in FIG. 24. Upon such a deformation of the clip member 202, the clip member is brought out of the compressive contact with the stimulable phosphor sheet 12. The sheet 12 is thus released.

Next, the roller 44 rotates in the direction of counter clockwise in the view of FIG. 25 to eject the stimulable phosphor sheet 12 which is in frictional contact with the roller 44 through opening 14 in the bottom end of the cassette 200. Since the stimulable phosphor sheet 12 is no longer in compressive contact with the clip member 202, torque required for the rotation of the roller 44 is considerably reduced compared to the case in which the stimulable phosphor sheet 12 has to be ejected while the sheet 12 is in compressive contact with a sheet-fastening means such as a clip. Such a reduction in the driving torque of the roller 44 has enabled use of a more inexpensive driving means of lower power.

Referring to FIG. 25, in the radiation image information reading apparatus 210, the stimulable phosphor sheet 12 which has been ejected from the cassette 200 is transferred through the information reading unit 38 to the information-reading unit 34 by the sheet transfer mechanism 36 comprising guide plates 48, 50, 58, 60, 66 and 84, nip rollers 46, 52, 54, 62, 64, 68 and 70, and the like. In the information reading unit 34, the stimulable phosphor sheet 12 is subjected to an information reading process to convert the recorded radiation image information into an output signal S, which is sent to an image-reproducing apparatus, for example, a CRT display apparatus or a photoscanning recording apparatus. The radiation image which had been recorded in the stimulable phosphor sheet 12 is then reproduced into a visual image.

The stimulable phosphor sheet 12 which has undergone the information reading process is transferred from the information reading unit 34 back to the information-erasing unit 38 by the sheet transfer mechanism 36. In the information-erasing unit 38, the radiation image information remaining in the sheet 12 after undergoing the information reading process is fully erased so that the sheet 12 would be ready for the next recording of the new radiation image information.

Next, the stimulable phosphor sheet 12 which has undergone the information-erasing process is returned into the cassette 200 by means of the roller 44 rotating in the direction opposite to the direction upon the ejection of the sheet 12 from the cassette 200, namely, in clockwise direction in the view of FIG. 25. After the returning of the stimulable phosphor sheet 12 into the cassette 200, the cover 18 of the cassette 200 is closed and the sheet 12 is brought into compressive contact with the clip member 202 by reversely repeating the process in the ejection of the sheet 12. More illustratively, the cassette-retaining pin 218 is withdrawn from the through hole 16H of the casing 16 by the actuator 220 to allow for the clip member 202 to restore its original shape as indicated by the solid line in FIG. 24 by the resiliency of the material from which it is made to thereby press the stimulable phosphor sheet 12 against the bottom plate 16B of the casing 16 to reliably hold the sheet 12 in place.

Next, the roller arm 45 is retracted from the cassette 200 by moving in the direction opposite to the arrow B in FIG. 25 to its waiting position. The cover 18, which has been widely opened, is then closed by the same means as the one used for its opening to leave a slight opening. Once the retraction of the roller 44 to its waiting position is detected by a detection means (not shown) and indicated by an indicator (not shown), the operator may unload the cassette 200 from the entrance Slot 40. Upon withdrawal of the cassette 200 from the slot 40, the cover 18 remaining slightly opened is pushed toward the casing 16 with a pair of rollers (not shown) so that locking pawls (not shown) provided on both the cover 18 and the casing 16 of the cassette 200 may engage with each other to lock the cover 18 in its fully closed state.

It should be noted that the spacer 24 shown in FIG. 24 is not an essential component in the cassette of the invention. Provision of such a spacer, however, may minimize the movement of the cassette-securing pin 218 and simultaneously, prevent the light from intruding into the interior of the cassette 200 through the through hole 16H.

The clip means for fastening the stimulable phosphor sheet 12 in position is not limited to the above-described first embodiment. For example, in the second embodiment shown in FIG. 27, the clip means comprises a clip member 222. The clip member 222 is fixedly secured at one end to the upper plate 16U of the casing, curved or bent at its intermediate portion so that the curved or bent intermediate portion may become in compressive contact with the stimulable phosphor sheet 12 on its substrate side, and protrudes at the other end beyond the spacer 204 so that the protruding end may be pushed by the cassette-securing pin 218 via the spacer 204. When the protruding end of the clip member 222 is pushed toward the upper plate 16U of the casing 16 by the cassette-securing pin 218 which has gone into the through hole 16H, the curved or bent intermediate portion of the clip member 16 which has been pressing the stimulable phosphor sheet 12 against the bottom plate 16B of the casing 16 will be lifted upward to release the stimulable phosphor sheet 12. The clip member 222 may comprise a material used for fabricating springs.

Figure 28:
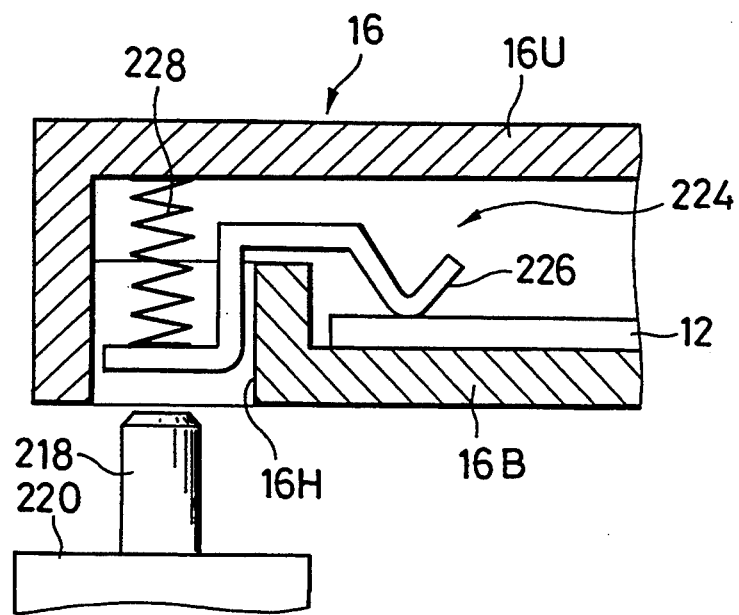
FIG. 28 is a transverse partial cross sectional view of a cassette having provided therein a sheet article-fastening means according to third embodiment of the fifth aspect of the invention.

Referring to FIG. 28, there is shown a clip means according to third embodiment. The clip means 224 of this embodiment comprises a clip member 226 which can move within the side end portion of the casing 16 in the direction vertical to the plane of the stimulable phosphor sheet 12 and a compression coil spring 228 confined between the top plate 16U of the casing 16 and one end of the clip member 226 to bring the other end of the clip member 226 into compressive contact with the stimulable phosphor sheet 12 on its substrate side. When the cassette-securing pin 218 protrudes into the through hole 16H to push the clip member 226 toward the top plate 16U of the casing 16 against the biasing of the compression coil spring 228, the end of the clip member 226 which has been in compressive contact with the stimulable phosphor sheet 12 will be lifted to release the stimulable phosphor sheet 12.

Figure 29:
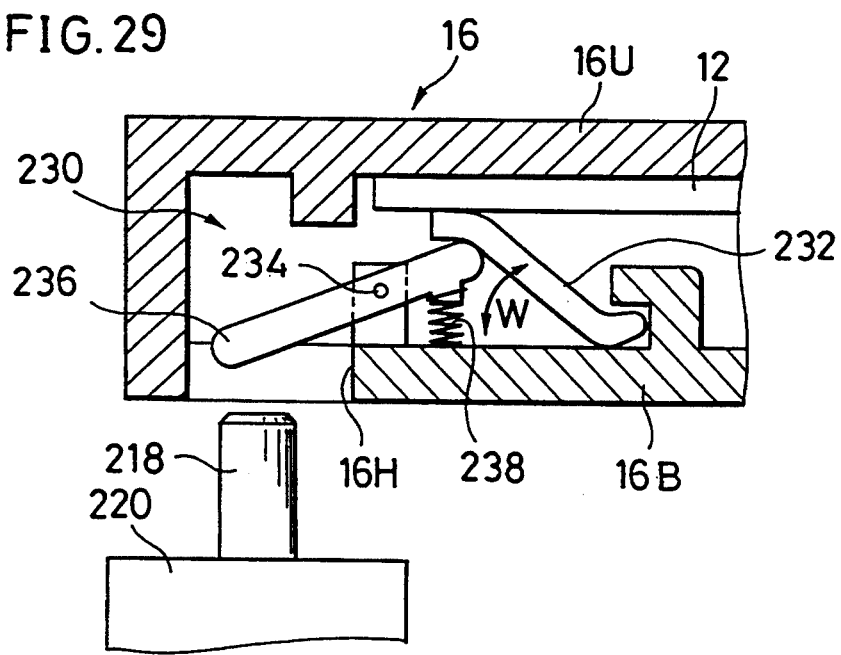
FIG. 29 is a transverse partial cross sectional view of a cassette having provided therein a sheet article-fastening means according to fourth embodiment of the fifth aspect of the invention.

Referring to FIG. 29, there is shown an embodiment wherein the stimulable phosphor sheet 12 is laid on the top plate 16U of the casing 16. The clip means 230 according to fourth embodiment comprises a clip member 232 which is secured at its proximal end to the bottom plate 16B of the casing 16 and which may swivel in the direction shown by arrow W in FIG. 29 so that its distal end may become in compressive contact with the stimulable phosphor sheet 12; a connection rod 236 pivotably secured to the bottom plate 16B of the casing 16 via a shaft 234 so that it may abut at one end against the distal end of the clip member 232 and at the other end protrude over the through hole 16H of the casing 16; and a compression coil spring 238 confined between the bottom plate 16B of the casing 16 and the end of the connection rod 236 abutting against the distal end of the clip member 232 to bring the distal end of the clip member 232 into compressive contact with the stimulable phosphor sheet 12 to thereby press the stimulable phosphor sheet 12 against the upper plate 16U of the casing 16. When the cassette-securing pin 218 protrudes into the through hole 16H of the casing to push the protruding end of the connection rod 236 toward the top plate 16U of the casing 16, the other end of the connecting rod 236 will then move toward the bottom plate 16B of the casing against the biasing of the compression coil spring 238 to release the distal end of the clip member 232, and in turn, the stimulable phosphor sheet 12 from the compressive contact.

Figure 30:
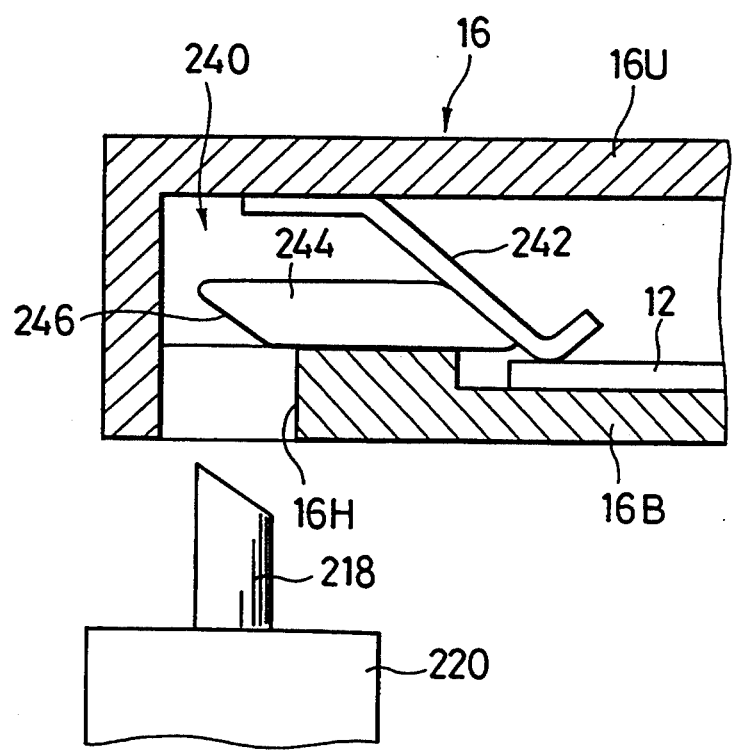
FIG. 30 is a transverse partial cross sectional view of a cassette having provided therein a sheet article-fastening means according to fifth embodiment of the fifth aspect of the invention.

Referring to FIG. 30, there is shown a clip means according to fifth embodiment. The clip means of this embodiment comprises a clip member 242 of a spring material which is fixedly secured at its proximal end to the upper plate 16U of the casing 16 and which is at its distal end in compressive contact with the stimulable phosphor sheet 12 on the substrate side; and a connection member 244 disposed on the bottom plate 16B of the casing 16 on outer side of the clip member 242 so that it may slide in transverse direction on the interior surface of the bottom plate 16B of the casing 16. The connection member 244 has a slope 246 defined on its outer side. When the cassette-securing pin 218 protrudes into the through hole 16H of the casing 16 to become in contact with the slope 246 of the connection member 244 to thereby push-the connection member 255 against the distal end of the clip member 242, the distal end of the clip member 242 will be lifted to release the stimulable phosphor sheet 12 from the compressive contact with the clip member 242.

Next, the cassette of the present invention according to sixth aspect is described in detail.

In the cassette according to fifth aspect of the invention, the clip means is provided in the cassette casing only at one side. Therefore, when the sheet articles of different widths are to be loaded in the cassette, it is necessary to provide clip means of different sizes in the cassette. Furthermore, in order to reliably secure the sheet article in place within the cassette, the sheet article has to be positioned along the side of the cassette at which the clip means is provided, rendering the handling of the cassette troublesome. Still further, securing of the sheet article at one point by the clip means may result in pivoting of the sheet article within the cassette around the point at which it is secured.

The problems as described above may be solved by providing two clip means on opposite sides of the cassette to thereby secure the sheet article in place at two points. Such a mechanism, however, would require provision with the apparatus into which the cassette is loaded of two clip-deforming mechanisms for the purpose of releasing the sheet article from the compressive contact with the clip means in correspondence with the clip means provided on opposite sides of the cassette, resulting in an increased complicity of the apparatus and consequently, in an increased production cost of the apparatus.

Accordingly, there is a demand for a cassette which can reliably hold the sheet article within its interior without any further complication in the mechanism of the apparatus into which it is loaded, and which may be handled conveniently. The cassette according to sixth aspect of the invention is directed to such a cassette.

The cassette according to sixth aspect of the invention is provided with a sheet article-fastening means having a sheet article-fastening member extending from one side of the cassette to the other side of the cassette, which presses the sheet article against one wall of the cassette by means of a biasing spring. Accordingly, the sheet article is uniformly pressed against the interior surface of the cassette by the sheet-article fastening member over its width regardless of the position of the sheet article within the cassette. Undesirable movement of the sheet article within the cassette is thereby prevented.

The sheet article-fastening member of this embodiment extending over the width of the cassette casing is brought into compressive contact with the sheet article by means of a biasing member. When the sheet article-fastening member is lifted by pressing the sheet article-fastening member at one position against the force exerted by the biasing spring, the sheet article is released from the compressive contact with the sheet article-fastening member. Accordingly, the apparatus into which the cassette is loaded is required to have only one mechanism for the releasing of the sheet article. Complication of the apparatus detracting from the cost performance is thus avoided.

The cassette according to sixth aspect of the present invention is hereinafter described in detail by referring to FIGS. 31 to 35.

Figure 31:
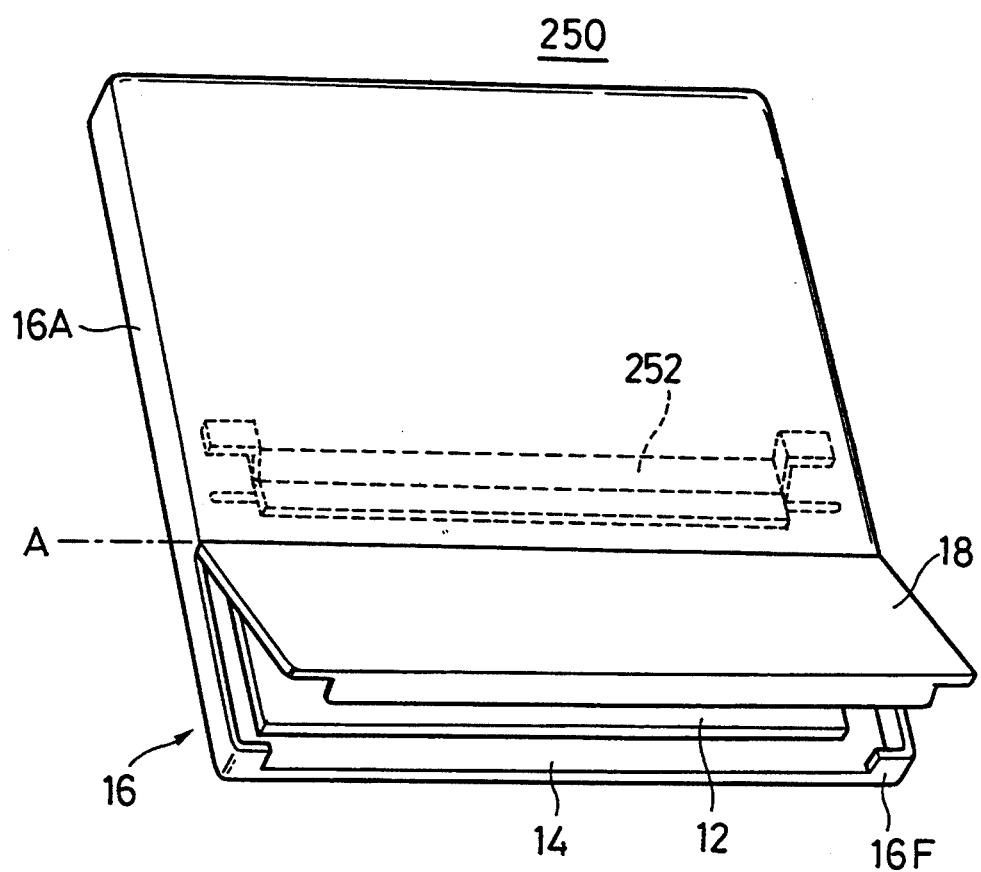
FIG. 31 is a perspective view of a cassette according to sixth aspect of the present invention with a sheet article accommodated in the cassette.
Figure 32:
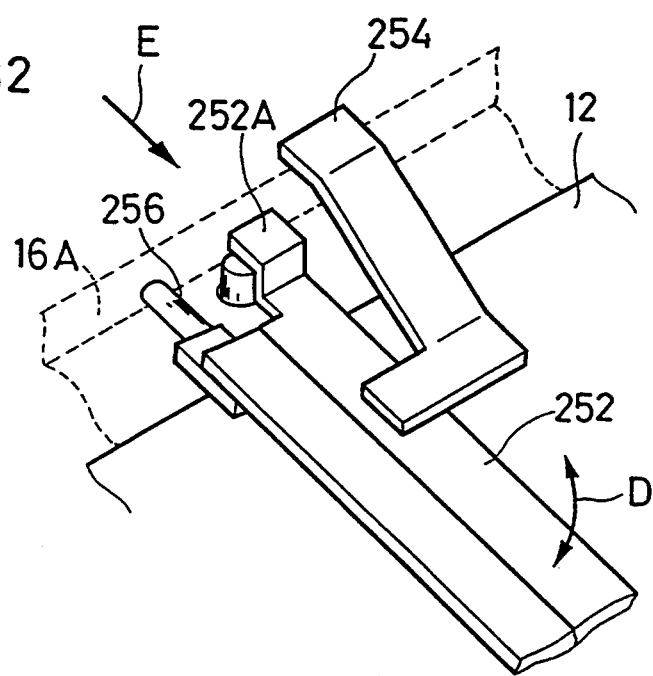
FIG. 32(a) is a partially cutaway perspective view.
FIG. 32(b) is a partial longitudinal cross sectional view of the cassette of FIG. 31 showing a sheet article-fastening means according to first embodiment of the sixth aspect of the invention.
Figure 32:
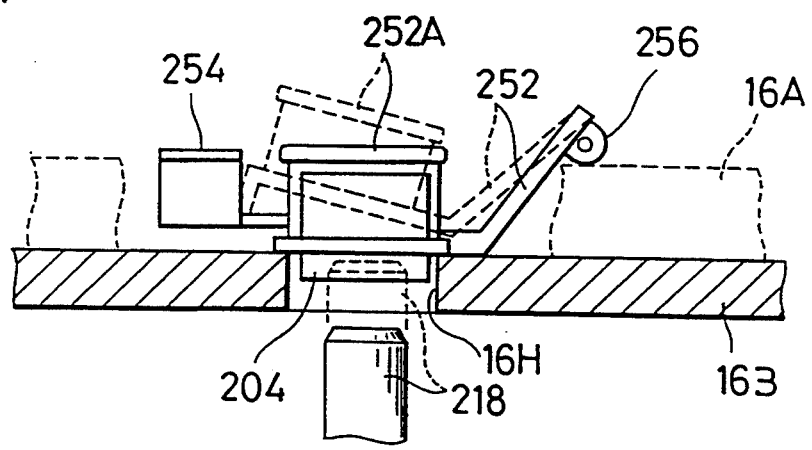
Figure 33:
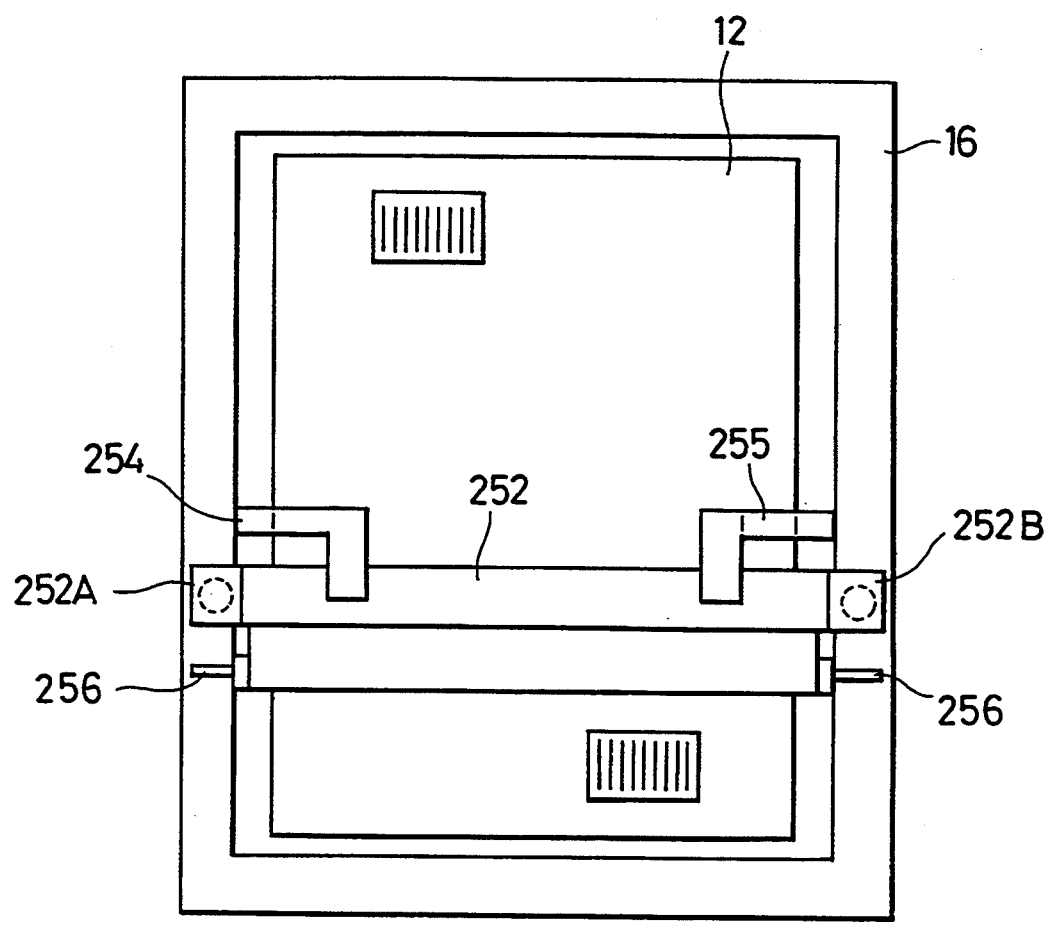
FIG. 33 is a plan view showing the interior of the cassette of FIG. 31.
Figure 34:
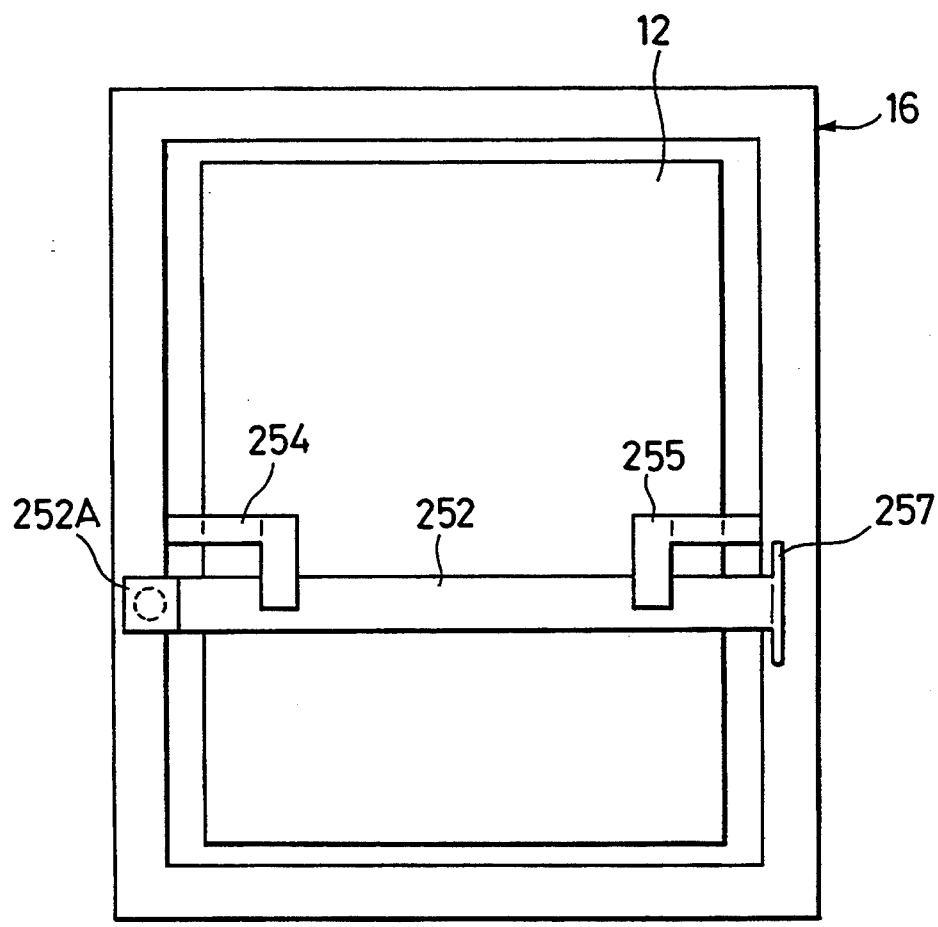
FIG. 34 is a plan view showing the interior of a cassette having provided therewith a sheet article-fastening means according to second embodiment of the sixth aspect of the invention.

Referring to FIG. 31, there is shown a cassette 250 according to first embodiment of the sixth aspect of the invention in its perspective view with the stimulable phosphor sheet 12 accommodated therein. The cassette 250 comprises an oblong, shallow casing 16 having defined in its front end an opening 14 for the unloading and the loading of the stimulable phosphor sheet 12 from and into the casing 16; and a cover 18 secured to the casing 16 to cover the opening 14. FIGS. 32(a) is a perspective view, and 32(b) is a longitudinal cross sectional view of one part of the cassette 250 shown in FIG. 31. FIG. 33 is a plan view of the interior of the cassette 250. The cassette 250 of FIGS. 31 to 33 is basically of a construction similar to the cassette 200 depicted in FIGS. 23 and 24 except for its sheet article-fastening means, and therefore, like numbers refer to similar parts and no additional description is given. For convenience of the description, the direction parallel to the stimulable phosphor sheet 12 and vertical to the longitudinal axis of the stimulable phosphor sheet, namely, the direction parallel to the swinging axis A indicated in the view of FIG. 31 is referred to as transverse direction; and the direction parallel to the longitudinal axis of the stimulable phosphor sheet 12 is referred to as longitudinal direction.

Referring to FIG. 33, a stay 252 extending from one side of the casing 16 to the other side of the casing 16 in transverse direction is provided in the casing 16. The stay 252 is secured at its opposite ends to the casing 16.

FIG. 32(a) is an enlarged perspective view of the portion of the cassette 250 where one end of the stay 252 is secured to the casing 16. FIG. 32(b) is a cross sectional view seen in the direction indicated by arrow E in FIG. 32(b). As shown in FIGS. 32(a) and 32(b), the stay 252 is pivotably secured at each end to the side wall 16A of the casing 16 by means of a pivot shaft 256 so that the stay 252 may be pivoted in the direction indicated by arrow D in FIG. 32(a) between the sheet-releasing position at which the stay 252 is no longer in frictional contact with the stimulable phosphor sheet 12 and the sheet-fastening position at which the stay 252 is in compressive contact with the stimulable phosphor sheet 12 to press it against the bottom plate 16B of the casing 16. The stay 252 is biased at opposite ends toward the stimulable phosphor sheet 12 by leaf springs 254 and 255 to bring the stay 252 into compressive contact with the stimulable phosphor sheet 12. The leaf springs 254 and 255 are made of a highly resilient (elastic) material such as a spring steel, and are fixedly secured at one end to the side wall 16A of the casing 16, and at the other end in compressive contact with the stay 252. Consequently, a uniform pressure would be applied to the stimulable phosphor sheet 12 along the stay 252 so that the stimulable phosphor sheet 12 would be reliably fastened within the casing 16.

As shown in FIGS. 32(a) and 32(b), the stay 252 has a protruding end 252A at its end. A circular through hole 16H is provided in the casing 16 through the bottom plate 16B of the casing 16 at a position in alignment with the end 252A of the stay 252. Once the cassette 250 is properly loaded in the image information reading apparatus 210, the cassette-securing pin 218 will be inserted into the through hole 16H. A spacer 204 is confined between the through hole 16H and the end 252A of the stay 252.

As in the case of the cassette 200 in the fifth aspect of the present invention, the cassette 250 having accommodated therein the stimulable phosphor sheet 12 which has undergone an image information-recording process is loaded into the radiation image information reading apparatus 210 shown in FIGS. 25 and 26. It should be noted that, upon transportation of the cassette 250 with the stimulable phosphor sheet 12 accommodated therein in such occasion as the recording of the image information or the reading of the recorded image information, the stimulable phosphor sheet 12 which is reliably pressed against the bottom plate 16B of the casing 16 by the stay 252 is prevented from undesirable movement within the casing 16.

The cassette 250 shown in FIGS. 31 to 33 is loaded in the radiation image information reading apparatus 210 for the purpose of reading the radiation image information recorded in the stimulable phosphor sheet 12, which is accommodated in the cassette 250. The radiation image information reading apparatus 210 is substantially the same as the one into which the cassette 200 shown in FIGS. 23 and 25 is loaded, and the radiation image information recorded in the stimulable phosphor sheet 12 accommodated in the cassette 250 is read and erased in a manner substantially the same as the case of the stimulable phosphor sheet 12 accommodated in the cassette 200 shown in FIGS. 23 and 25, although the mechanism of fastening and releasing the stimulable phosphor sheet 12 within the cassette 250 upon loading and unloading of the cassette 250 into and out of the apparatus 210 is different. Therefore, no further description is given with regard to the image information reading and erasing processes.

In the loading of the cassette 250 in the apparatus 210, the cassette 200 is inserted downward through the entrance slot 40 with the front wall 16F of the casing 16 facing downward until the front wall 16F becomes in contact with the stoppers 213 and 215 and the cassette 250 is properly set in position. Upon completion of the insertion of the cassette 250, the cassette-securing pin 218 of the apparatus 210 is inserted into the through hole 16H of the casing 16 by the actuator 220. When the cassette-securing pin 218 protrudes into the through hole 16H and pushes the spacer 204, and in turn, the end 252A of the stay 252, the stay 252 is lifted to its releasing position, which is shown by the broken line in FIG. 32(b), so that the stay 252 is no longer in compressive contact with the stimulable phosphor sheet 12. The stimulable phosphor sheet 12 is then released. It should be noted that the lifting of the stay 252 to its releasing position may be readily accomplished by pushing the end 252A of the stay 252, and therefore, provision of only one cassette-securing pin 218 with the apparatus 210 is required.

Next, the roller 44 rotates in the direction of counter clockwise in the view of FIG. 25 to eject the stimulable phosphor sheet 12 which is in frictional contact with the roller 44 through opening 14 in the bottom end of the cassette 250. Since the stimulable phosphor sheet 12 is no longer in frictional contact with the stay 252, torque required for rotating the roller 44 is considerably reduced compared to the case wherein the stimulable phosphor sheet 12 has to be ejected with the sheet 12 being in compressive contact with a sheet-fastening means. Such a reduction in the torque of the roller 44 has enabled use of a more inexpensive means of lower power for the driving of the roller 44.

The stimulable phosphor sheet 12 which has been ejected from the cassette 250 is then transferred by the sheet transfer system 36 through the information-erasing unit 38 to the information reading unit 34, where the radiation image information which had been recorded in the stimulable phosphor sheet 12 is read. After the image information reading, the stimulable phosphor sheet 12 is again transferred by the sheet transfer system 36 back to the information-erasing unit 38, where the radiation image information remaining in the sheet 12 after the information reading is utterly erased. The stimulable phosphor sheet 12 is then transferred by the sheet transfer system 36 back to the cassette-loading unit 32. In the cassette-loading unit 32, the stimulable phosphor sheet 12 which has undergone the image-erasing process is returned into the cassette 250 by the roller 44 which is rotating in the direction opposite to the direction upon the ejection of the sheet 12 from the cassette 250, namely, in clockwise direction in the view of FIG. 25. After the returning of the stimulable phosphor sheet 12 into the cassette 250, the cover 18 of the cassette 250 is closed and the sheet 12 is brought into compressive contact with the stay 252 by reversely repeating the process in the ejection of the sheet 12. More illustratively, the cassette-retaining pin 218 is withdrawn from the through hole 16H of the casing 16 by the actuator 220 to allow for the stay 252 to go back to the position indicated by the solid line in FIG. 32(b) by the resiliency of the leaf springs 254 and 255 to thereby press the stimulable phosphor sheet 12 against the bottom plate 16B of the casing 16 and reliably hold the sheet 12 in place. Next, the cover 18, which has been fully opened, is closed by the same mechanism as the one used for the opening of the cover to leave a slight opening. Upon withdrawal of the cassette 200 from the slot 40, the cover 18 remaining slightly opened is fully closed by the locking means (not shown).

The mechanism for facilitating the movement of the stay 252 between its sheet article-releasing position and its sheet article-fastening position is not limited to the above-described first embodiment, and various other mechanisms may occur to those skilled in the art. For example, in the second embodiment shown in FIG. 34, the stay 252 is provided at one end with a pivot shaft 257, and the stay 252 is pivotably secured to one side of the casing 16 to allow for pivoting around the pivot shaft 257. The stay 252 is biased toward the bottom plate 16B of the casing 16 by leaf springs 254 and 255 so that the stay 252 is in compressive contact with the stimulable phosphor sheet 12 to press it against the bottom plate 16B of the casing 16. The stay 252 may be lifted to its sheet-releasing position by inserting the cassette-securing pin 218 into the through hole 16H to push up the end 252A of the stay 252 against the biasing force exerted by the leaf springs 254 and 255 as in the case of the above-described first embodiment.

Figure 35:
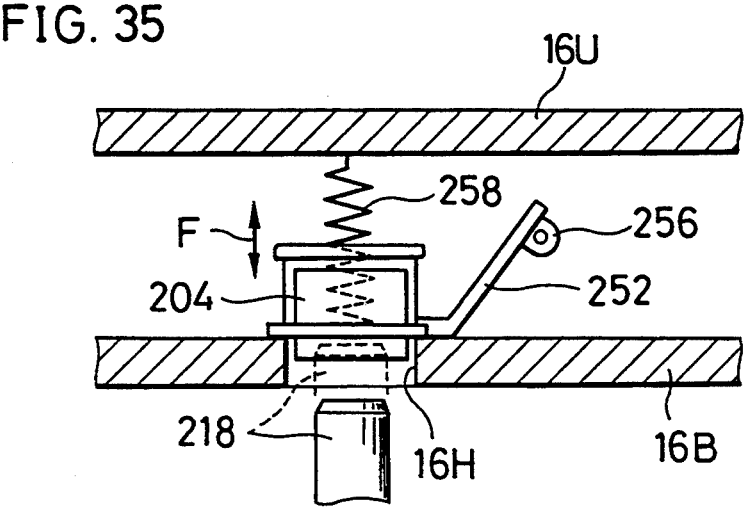
FIG. 35 is a partial longitudinal cross sectional view of the cassette having provided therewith a sheet article-fastening means according to third embodiment of the sixth aspect of the invention.

Referring to FIG. 35, there is shown a cassette according to third embodiment wherein the stay 252 is brought into compressive contact with the stimulable phosphor sheet 12 by means of a compression coil spring 258 instead of the leaf spring used in the first and second embodiments. In such a case, it would be preferable to fixedly secure the compression coil spring 258 to the top plate 16U of the casing 16 at its substantially central position in the transverse direction. Upon insertion of the cassette-securing pin 218 into the through hole 16H, the compression coil spring 258 will undergo deformation to enable the stay 252 to be lifted to its sheet-releasing position, and upon withdrawal of the cassette-securing pin 218 from the through hole 16H, the coil spring 258 will restore its original shape to return the stay 252 to its sheet-fastening position.

In the above-described first and second embodiments, two biasing leaf springs 254 and 255 are employed to bring the stay 252 into its sheet-fastening position. The number of the biasing leaf springs, however, may be reduced to one so long as the stimulable phosphor sheet 12 can be reliably fastened in its place by the stay 252 with a uniform pressure being applied to the stimulable phosphor sheet 12 along the length of the stay 252.

It should be noted that the spacer 204 shown in FIG. 32(b) and 35 is not an essential component in the cassette of the invention. Provision of such a spacer, however, may minimize the movement of the cassette-securing pin 218 and simultaneously, prevent the light from intruding into the interior of the cassette 250 through the through hole 16H.

In the above-described preferred embodiments of the invention, the cassette of the present invention has been described for the cases wherein the stimulable phosphor sheet is accommodated in the cassette. Those skilled in the art, however, may readily appreciate that the cassette of the present invention can be used for various other cases wherein a sheet article other than such a stimulable phosphor sheet, for example, an X-ray film, is accommodated in the cassette.

What is claimed is:

1. A sheet article containing cassette for use in a machine which introduces and extracts the sheet article from the cassette, comprising:
   a casing for containing the sheet article, said casing having an opening formed therein on one end and having an end opposite the opening;
   a cover for opening and closing the opening, said cover being movably secured to said casing closer to the end at which the opening is formed than to the end opposite the opening;
   fastening means for securing said sheet article inside said casing regardless of whether said opening is open or closed; and
   a rigid member formed on an abutting inner wall face of said casing, said rigid member cooperating with a roller of the machine for introducing and extracting said sheet article.

2. A sheet article containing cassette according to claim 1, wherein said sheet article includes a recording medium having a recording layer on a substrate, wherein said fastening means is adapted to frictionally abut against the substrate of said sheet article, and wherein said casing includes an abutting inner wall face against which said sheet article is secured by said fastening means.

3. A sheet article containing cassette according to claim 1, wherein said fastening means includes an elastic member.

4. A sheet article containing system for containing a sheet article in the cassette defined by claim 1, wherein said sheet article has a back face which faces the inner wall face of said casing when said sheet article is contained in the cassette, and,
   wherein a magnet is arranged on one of the back face of said sheet article and the inner wall face of said casing, and a member to be magnetically attracted by said magnet is arranged on the other of the inner back face of the sheet article and the inner wall face of said casing so that said sheet article is contained in the casing by the attraction of said magnet and said member to each other.

5. A sheet article containing system according to claim 4, wherein at least one of said magnet and said member to be magnetically attracted by at least one of said magnet is tapered in the containing direction of said sheet article.

6. A sheet article containing system according to claim 4, wherein a member for protecting the front surface of said sheet article is disposed on the abutting inner wall face of said casing against said front surface.

7. A sheet article containing system for containing a sheet article in a cassette according to claim 1, wherein when said cassette is loaded in the machine,
   an electromagnet is arranged in a container loading unit of said machine and a magnetic member to be magnetically attracted by said electromagnet is arranged on a back face of said sheet article, so that after said sheet article has been conveyed to a predetermined position in said cassette by conveying means of said machine, said electromagnet is energized to attract said magnetic member to close the cover of said casing.

8. A sheet article containing system according to claim 7, wherein a member for protecting the front surface of said sheet article is disposed on the abutting face of the inner wall of said casing against said front surface.

9. A sheet article containing cassette according to claim 1, wherein said casing comprises a through hole into which a cassette-securing member provided with an apparatus for reliably securing the cassette in position loaded in the apparatus, and wherein said fastening means is a clip means comprising;
   a sheet article-fastening portion which is in compressive contact with the sheet article at one point, and
   a biasing mechanism bringing said sheet article-fastening portion into said compressive contact with said sheet article,
   said cassette-securing member being inserted into said through hole to deform said biasing mechanism to thereby bring said sheet article-fastening portion of said clip means out of said compressive contact with said sheet article and release said sheet article from said clip means.

10. The sheet article containing cassette according to claim 1, wherein said casing comprises a through hole into which a cassette-securing member provided with an apparatus for reliably securing the cassette in position loaded in the apparatus, and wherein said fastening means comprises;
   a sheet article-fastening member extending in transverse direction from one side to the other side of said casing, said sheet article-fastening member being secured to said casing at least at one end such that said sheet article-fastening member is movable between a sheet article-fastening position wherein said sheet article-fastening member is in compressive contact with said sheet article over its width and a sheet article-releasing position wherein said sheet article-fastening member is no longer in contact with said sheet article, and
   a spring member for bringing said sheet article-fastening member into said compressive contact with said sheet article, said cassette-securing member being inserted into said through hole to directly or indirectly push said sheet article-fastening member to thereby move said sheet article-fastening member from its sheet-article fastening position to its sheet-article releasing position against biasing of said spring member.

11. A sheet article containing cassette according to claim 1, wherein said fastening means includes a magnetic member disposed on a back face of said sheet article and a magnet disposed on an inner wall face of said cassette, so that said magnetic member is attracted to said second magnet and said sheet article is secured within said cassette.

12. A sheet article containing cassette according to claim 1, wherein said fastening means includes a magnetic member disposed on a back face of said sheet article and an electromagnet disposed outside said cassette, so that said magnetic member is attracted to said electromagnet when said electromagnet is energized and said sheet article is secured within said cassette.

13. A sheet article containing cassette according to claim 1, wherein said fastening means includes pawls pivotally supported by said casing.

* * * * *